United States Patent [19]
Saito

[11] Patent Number: 5,260,975
[45] Date of Patent: Nov. 9, 1993

[54] DIGITAL DEMODULATOR

[75] Inventor: Shigeki Saito, Yokohama, Japan

[73] Assignee: Nippon Telegraph and Telephone Corporation, Tokyo, Japan

[21] Appl. No.: 720,505

[22] PCT Filed: Oct. 19, 1990

[86] PCT No.: PCT/JP90/01350
 § 371 Date: Jul. 25, 1991
 § 102(e) Date: Jul. 25, 1991

[87] PCT Pub. No.: WO91/06166
 PCT Pub. Date: May 2, 1991

[30] Foreign Application Priority Data

Oct. 23, 1989 [JP] Japan .................... 1-275662
Oct. 27, 1989 [JP] Japan .................... 1-280063
Oct. 30, 1989 [JP] Japan .................... 1-282610

[51] Int. Cl.⁵ .................. H03D 3/22; H04L 27/22
[52] U.S. Cl. ....................... 375/81; 375/83; 455/214; 329/346; 328/133
[58] Field of Search ............... 375/80, 81, 119, 120, 375/83; 455/214; 329/345, 346, 307, 304; 328/133, 134; 307/510

[56] References Cited

U.S. PATENT DOCUMENTS 4,754,174 6/1988 Matthies ............. 328/133 X
5,128,626 7/1992 Iwasaki .............. 375/81 X

OTHER PUBLICATIONS

Shigeki Saito, Hiroshi Suzuki, "Fast Carrier-Tracking Coherent Detection with Dual-Mode Carrier Recovery Circuit for Digital Land Mobile Radio Transmission," *IEEE Journal on Selected Areas in Communications*, vol. 7, No. 1, Jan. 1989.
Hiroshi Suzuki, Yasushi Yamao and Hiroyuki Kikuchi, "A Single-Chip MSK Coherent Demodulator for Mobile Radio Transmission," IEEE, 0018-9545/85/11-00-10157, 1986.
Gary J. Saulnier, William Rafferty, "DSP-Based Non Coherent Dual Detector Demodulator For Land Mobile Radio Channels," IEEE CH2314-Mar. 1986.

*Primary Examiner*—Curtis Kuntz
*Assistant Examiner*—Tesfaldet Bocure
*Attorney, Agent, or Firm*—Cushman, Darby & Cushman

[57] ABSTRACT

A digital demodulator wherein a phase difference is detected between a reference signal and an angle-modulated wave, the difference in frequency is detected between the angle-modulated carrier wave and the reference signal based on the phase difference, and the phase of the reference signal to be set is controlled based on the phase and frequency difference. That is, the detection of the angle-modulated wave, the detection of the phase and frequency differences, and the phase control are performed using digital circuits. Therefore, excellent error rate is exhibited under noise and fading conditions, and it is possible to realize a small-sized low-cost demodulator which requires lower power and no adjustment.

11 Claims, 28 Drawing Sheets

DIGITAL DEMODULATOR

TECHNICAL FIELD

This invention is applicable to a circuit which demodulates data signals from phase modulated signals transmitted by phase modulating carriers with data signals. This invention is more particularly related to a digital demodulator which has an excellent bit error rate performance under thermal noises or fading, which can be reduced in power consumption, size and cost, and which does not need adjustment.

BACKGROUND TECHNOLOGY

There have been known a coherent detector and a differential detector as the detector to be used for demodulation of digital phase modulated signals. The coherent detector is known to achieve the highest performance theoretically, but in the transmission channels where high speed fading exists such as mobile communication system, a differential detector is often found more advantageous than the former.

FIG. 39 is a block diagram to show the basic structure of a coherent detector.

In the figure, phase modulated signals are inputted via an input 301 at a carrier recovery circuit 302 to recover the signals coherent to the carriers of the phase modulated signals. In a detector 303 in which phase modulated signals are inputted from the input 301 similarly, the phase modulated signals are detected by means of recovered carriers outputted from the carrier recovery circuit 302 and the detection output thereof is sent out from an output 304. Optimal coherent detection will be achieved if carriers are recovered at the circuit 302 without thermal noises or random FM noises which are caused by fading.

Most of the carrier recovery circuits currently in use are structured to remove mainly the effect of thermal noises, and although they can recover stable carriers under the conditions with many thermal noises, the phase of the recovered carriers cannot quite follow rapid changes such as occurring in random FM noises caused by fading to thereby degenerate the performance.

The differential detector, on the other hand, is inferior to the coherent detector in performance under thermal noises, but under fast fading which causes rapid phase changes, it shows better performance than the coherent detector.

FIG. 40 is a block diagram to show the basic structure of a differential detector.

In FIG. 40, phase modulated signals are inputted via an input 311 at a delay circuit to be delayed by an amount equivalent to one or two symbols of the data, and multiplied with a phase modulated signal which has been delayed by the detector 313 which receives signals from the input 311, so that detection output recovered from the phase difference therebetween is transmitted from an output 314.

The differential detector of this type is structured to detect input phase modulated signals by referring to the phase of the signal one or two symbols before, and does not require carrier recovery to thereby enable simplification of the circuit structure. However, it requires delay lines equivalent to one or two symbols of the data.

As it is not easy to manufacture delay lines which are high in precision and suitable to circuit integration, shift registers such as shown in FIG. 41 are usually utilized to delay phase modulated signals. In FIG. 41, the reference numeral 315 denotes a shift register using the output from a single frequency oscillator 316 as a clock and is equivalent to the delay circuit 312.

FIG. 42 shows in a block diagram a demodulator using a digital signal processing type detector.

In FIG. 42, phase modulated signals are inputted via an input 321 at multipliers $322_1$, $322_2$, and detected by signals having the frequency substantially similar to the carrier frequency (quasi-coherent detection). A single frequency oscillator 323 generates signals of the frequency substantially similar to the carrier frequency, and transmits the same to the multiplier $322_1$ as they are and to the multiplier $322_2$ via a $\pi/2$ shift circuit 324. The in-phase and quadrature signals or the outputs from the multipliers $322_1$ and $322_2$ are inputted at analog/digital converters (A/D) $326_1$ and $326_2$ via low pass filters (LPF) $325_1$ and $325_2$ to be digitized. Digital signals are inputted at a digital signal processing type detector 327 and detected coherently or differentially by digital signal processing. This method enables construction of various types of detectors by so programming the digital signal processing type detector 327.

When a detector is mounted on a mobile radio equipment, it is usually necessary to consider not only thermal noises but also random FM noises which are caused by fading. The prior art coherent detector could not quite solve the problems mentioned above. Besides, coherent detectors need voltage controlled oscillators for recovery of carriers, but it is quite difficult to mass-produce voltage controlled oscillators having uniform characteristics, and adjustment of variations is difficult. Voltage controlled oscillators are difficult to be digitized as well as to make characteristics uniform if they are incorporated in ICs.

Differential detectors are defective in that shift-registers of multi-stages need to be operated at fast speed in order to achieve a high precision in delay, but this consumes a large amount of power If a single frequency oscillator is used as an input clock for shift registers, when the carrier frequency of phase modulated signals drifts, it becomes difficult to conduct stable detection.

This invention was conceived in order to overcome the difficulties encountered in the prior art, and aims at providing a digital demodulator which can achieve excellent demodulation performance under fading, simplify the circuit structure, reduce power consumption, and be structured as a fully digitized integrated circuit which requires no adjustment.

DISCLOSURE OF THE INVENTION

This invention relates to a digital demodulator having a reference signal generator means for generating a predetermined reference signal according to a received phase modulated signal and a detector circuit for detecting said phase modulated signal using the reference signal, which is characterized in that said reference signal generator means includes a phase difference detection means which detects the difference between the phase of said reference signal and the phase of said phase modulated signal and outputs the phase difference data, a reference signal phase prediction means which predicts the phase of said reference signal to be newly set and outputs the reference signal phase prediction data decided in accordance with the reception level of said phase modulated signal, and a reference signal control means which takes in said reference signal prediction data and generates a reference signal having a designated phase out of an input clock.

This invention is further characterized in that said reference signal generator means may include a frequency drift detection means which takes in said phase difference data, detects the frequency drift of the carriers of said phase modulated signals from said reference signal, and outputs it as frequency drift data, a means for generating frequency drift compensation data which takes in the frequency drift data and outputs frequency drift compensation data for controlling the phase of said reference signal in accordance with the frequency drift, and an adder means which adds the reference signal phase prediction data outputted from said reference signal phase prediction means and said frequency drift compensation data and transmits the result of addition to said reference signal control means.

This invention is further characterized in that said frequency drift compensation data generator means may include a means which controls the value of said frequency drift compensation data not to exceed a predetermiend value.

This invention relates to a digital demodulator having a reference signal generator means for generating a predetermined reference signal in accordance with a received phase modulated signal, and a detector means for detecting said phase modulated signal with this reference signal, which is characterized in that said reference signal generator means may include a phase difference detector means which detects the difference between the phase of said reference signal and the phase of said phase modulated signal and outputs phase difference data, detects deviation from the modulation phase which is allowable at the time of decision ., and outputs phase deviation data, a reference signal phase prediction means having a memory which generates carrier phase deviation data corresponding to phase changes in the carriers by using said phase deviation data and the memory output data, holds said carrier phase deviation data over past decision timings of a predetermined number, receives the data as an input, and outputs the data for predicting the phase of the reference signal at the next decision timing as an address input, and a reference signal control means which takes in said reference signal phase prediction data and generates a reference signal having a designated phase out of input clocks.

This invention is further characterized in that said reference signal phase prediction means may include an averaging circuit which averages said phase deviation data over past decision timings of a predetermined number corresponding to the received levels of said phase modulated signals and outputs the same as the reference signal phase average data, and a selection circuit which outputs as the reference signal phase prediction data at the next decision timing either the output data from the memory or said reference signal phase average data depending on the reception level.

This invention may include a phase difference distribution detection means which takes in said phase difference data, latches them at every decision timing, and detects distribution of said phase difference, and a frequency drift detection means which calculates the drift and the direction of frequency drift of said carrier in accordance with the phase difference distribution data.

This invention is further characterized in that said frequency drift detection means may include a means which is controlled to output the drift when the drift exceeds a predetermined value and is controlled to measure again if the direction of the drift cannot be determined by measurements at a predetermined time interval.

This invention is characterized in that it may include a means which measures the frequency of a phase modulated signal or a phase modulated signal subjected to frequency conversion within a time length which is equivalent to the period of one symbol multiplied by an integer during the time when the amplitude of said phase modulated signal from the transmitter side does not become zero, and when the digital demodulator is receiving the phase modulated signals which have been modulated by a preamble for clock recovery to have clock frequency component after detection.

This invention relates to a digital demodulator having a single frequency oscillator means which generates two different signals of the frequency substantially similar to that of the carrier of received phase modulated signals but deviated from one another by $\pi/2$ in their phase, a quasi-coherent detection means which quasi-coherently detects said phase modulated signals with said two signals, an analog/digital converter which digitizes the output signals from said quasi-coherent detection means, a reference signal generator means which generates a predetermined reference signal in accordance with said phase modulated signals, and a digital signal processing type detection means which detects the output signals from said analog/digital converter using the reference signal respectively, which is characterized in that said reference signal generator means may include a phase difference detection means which detects the phase difference between the phase of said reference signal and that of said phase modulated signal and outputs phase difference data, a reference signal phase prediction means which takes in said phase difference data, predicts the phase of said reference signal to be newly set, and outputs the reference signal phase prediction data selected in accordance with the reception level of said phase modulated signals, and a reference signal control means which takes in said reference signal phase prediction data and generates a reference signal having a designated phase out of input clocks.

The operation of above technical means according to this invention will now be described.

The phase difference detection means of the reference signal generator detects the difference in phase between the reference signal and said phase modulated signal and outputs the phase difference data. The reference signal phase prediction means takes in the phase difference data, predicts the phase of the reference signal to be newly set, and outputs reference signal phase prediction data which is selected in accordance with the reception level of the phase modulated signals. The reference signal control means takes in the reference signal phase prediction data, and generates a reference signal having a designated phase out of input clocks.

The frequency drift detection means of the reference signal generator takes in said phase difference data, detects the frequency drift of the carrier of the phase modulated signals from the reference signal, and outputs it as the frequency drift data. The means for generating frequency drift compensation data takes in the frequency drift data, and outputs frequency drift compensation data for controlling the phase of said reference signal in accordance with the frequency drift, and the adder means adds the reference signal phase prediction data outputted from the reference signal phase prediction means and said frequency drift compensation data, and transmits the addition data to the reference signal control means.

As described in the foregoing, this invention is remarkably effective in reduction of effects from various types of noises, especially in achieving excellent demodulation performance under fading, simplification of circuits, reduction of power consumption, and constructing the device as a fully integrated digital circuit without necessity of adjustment.

Figure 1:
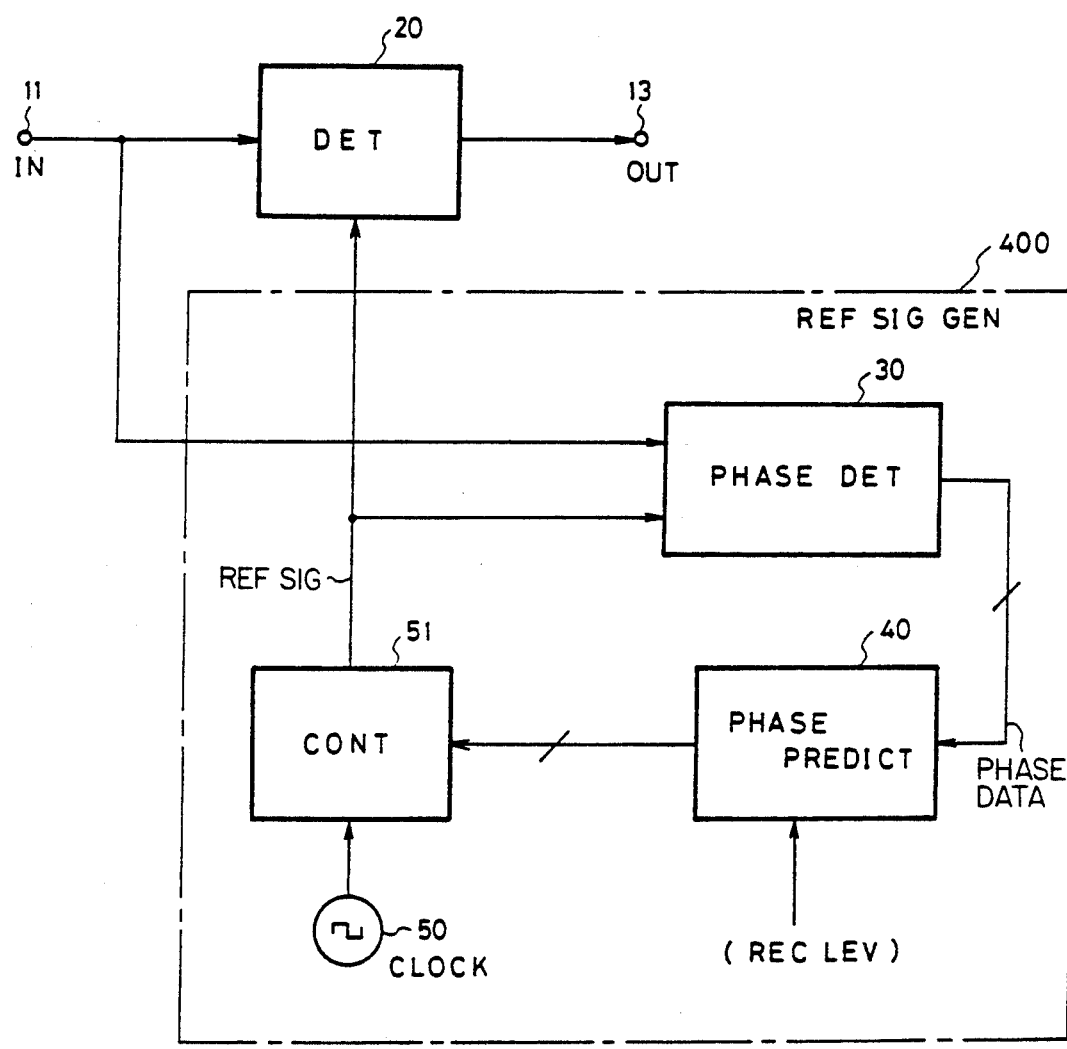
FIG. 1 is a block diagram to show the first embodiment of this invention digital demodulator.

In the figures, the reference numerals correspond to the component parts as below:

| | |
|---|---|
| 11, 301, 311, 321 | input |
| 13, 304, 314 | output |
| 20, 303, 313 | detection circuit |
| 21, 324, 333 | $\pi/2$ shift circuit |
| 23, 31, 81 | flip-flop |
| 312 | delay circuit |
| 322 | multiplier |
| 30, 30', 80 | phase difference detection means |
| 33, 55, 73, 83, 315 | shift register |
| 37 | phase deviation generation means |
| 40, 40' | reference signal phase prediction means |
| 41 | phase shift converter means |

-continued

| | |
|---|---|
| 42, 43, 61, 65, 91 | latch circuit |
| 43, 44, 47 | averaging circuit |
| 45, 57, 68, 103 | multiplexer |
| 46 | phase compensation circuit |
| 48 | memory |
| 49 | selector circuit |
| 50, 107 | clock generator |
| 51, 51' | reference signal generating means |
| 53 | frequency divider |
| 61 | frequency drift detection means |
| 62, 66 | addition circuit |
| 63 | frequency drift compensation data generation means |
| 67 | adder |
| 69 | addition means |
| 70 | phase shift means |
| 90, 90' | phase difference distribution detection means |
| 93 | phase difference processing circuit |
| 95, 223 | counter |
| 97 | phase difference decision circuit |
| 100, 100' | frequency drift detection means |
| 101 | subtracter |
| 105 | up-down counter |
| 108 | timer circuit |
| 109 | counted number detection circuit |
| 211 | preamble generation circuit |
| 213 | modulator |
| 215 | modulated signal output |
| 221 | modulated signal input |
| 222 | limitter amplifier |
| 225 | gate signal generator |
| 226 | timer |
| 227 | clock for timer |
| 229 | reference signal frequency generation circuit |
| 230 | reference signal input |
| 231 | detector |
| 233 | clock recovery data generation circuit |
| 235, 604 | clock recovery circuit |
| 302 | carrier recovery circuit |
| 316, 323 | single frequency oscillator |
| 325 | low-pass filter (LPF) |
| 326 | analog/digital converter (A/D) |
| 327 | digital signal processing type detection circuit |
| 334 | quaternarizing circuit |
| 335 | loop filter |
| 400 | reference signal generation means |
| 500 | frequency drift detection circuit |
| 601 | limitter |
| 602 | digital oscillator |
| 603 | direct phase quantization circuit |
| 605 | reference signal phase prediction circuit |
| 606 | frequency drift detection circuit |
| 607 | decoder |
| 608 | phase likelihood detection means |

OPTICAL MODE TO REALIZE THE INVENTION

Figure 2:
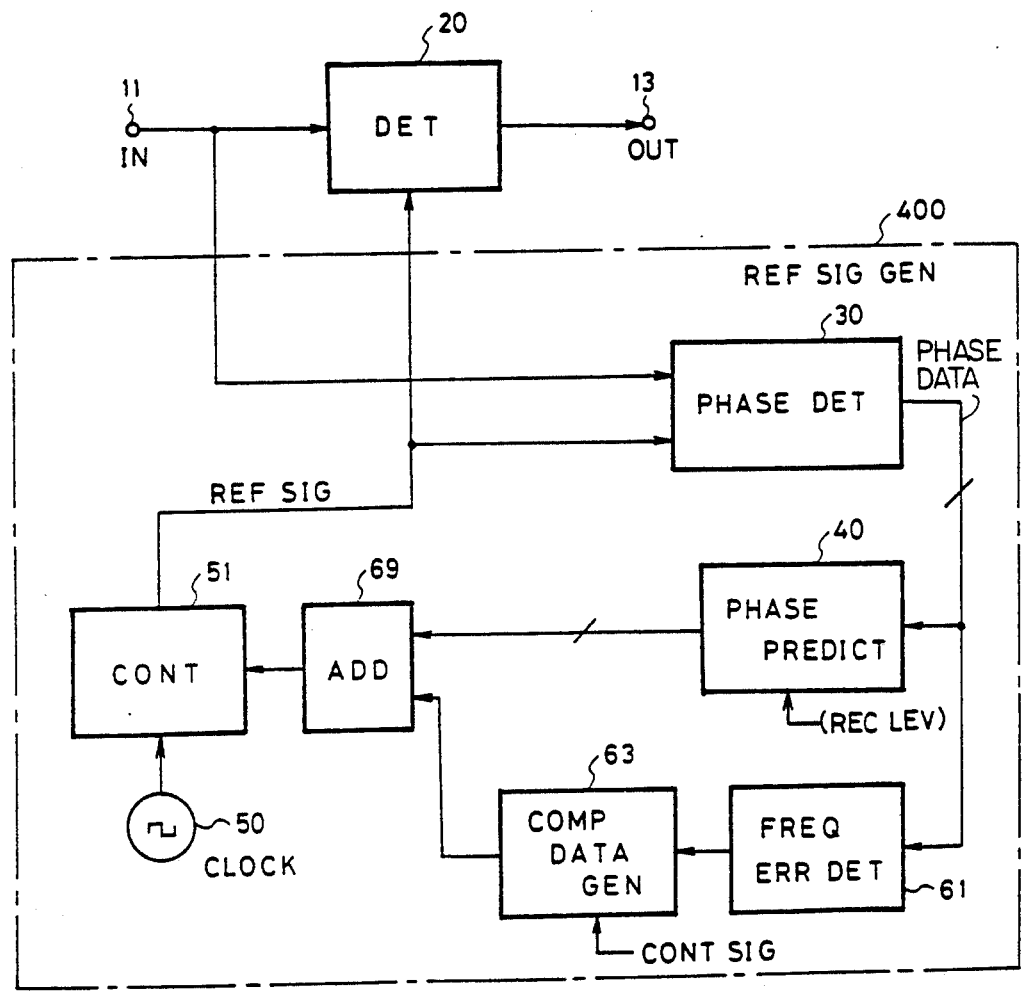
FIG. 2 is a block diagram to show the second embodiment of this invention digital demodulator.
Figure 3:
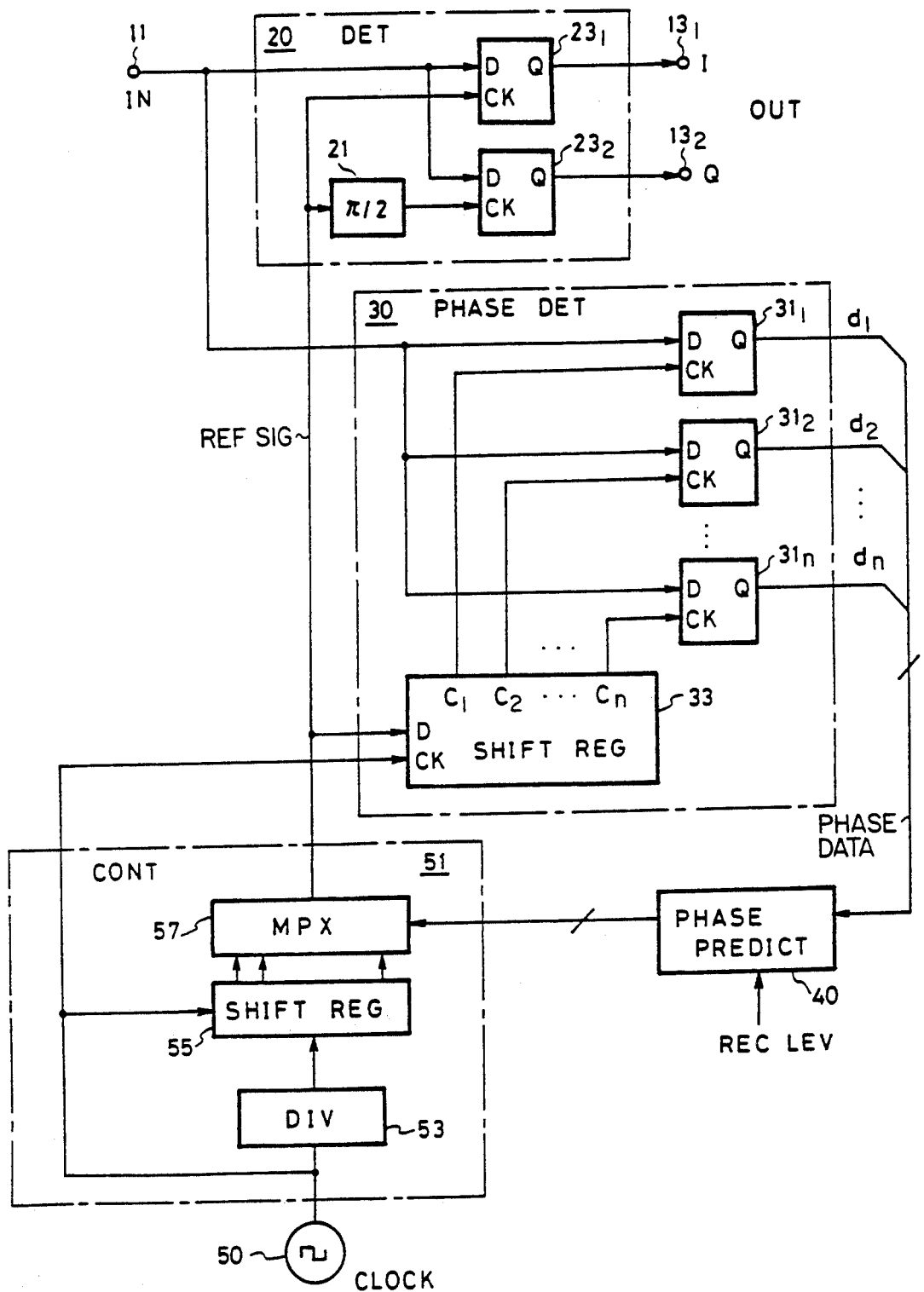
FIG. 3 is a block diagram to show in more detail the first embodiment of this invention digital demodulator.
Figure 10:
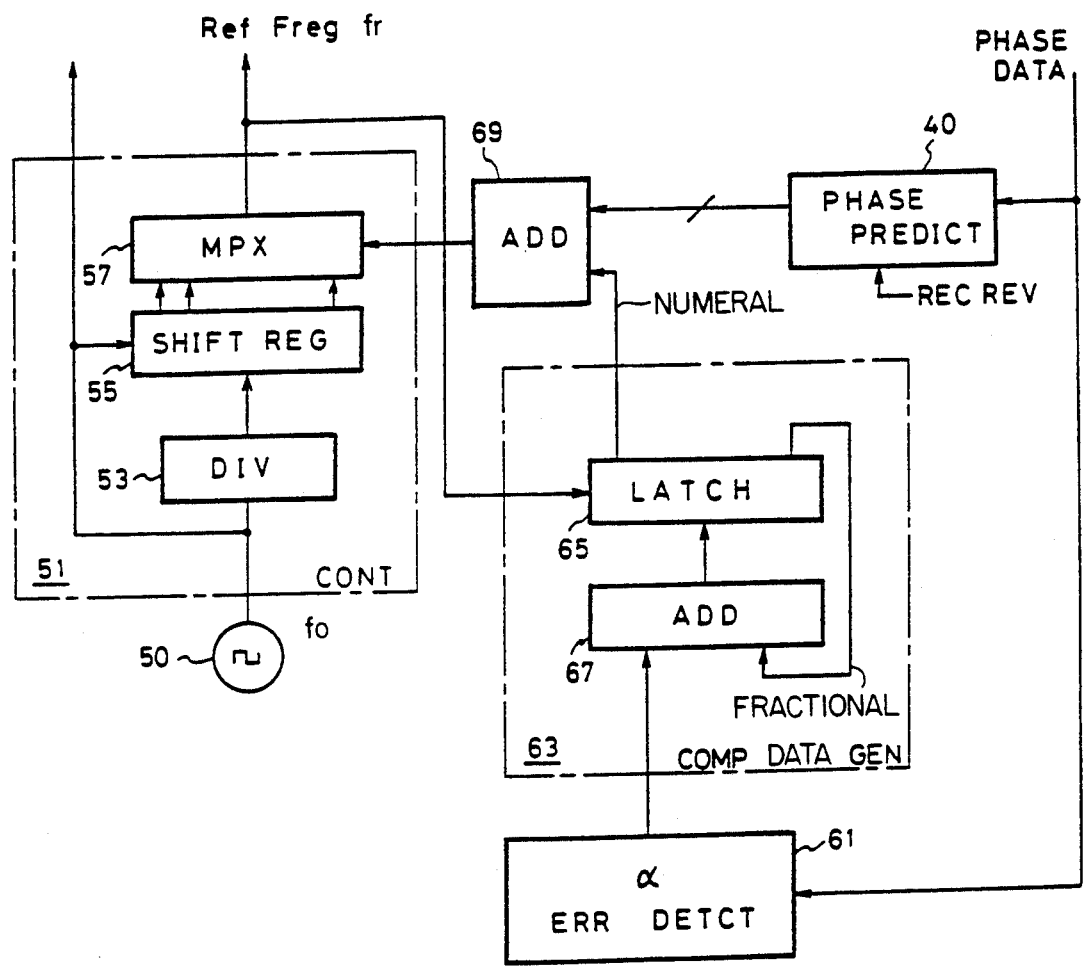
FIG. 10 is a block diagram to show in more detail the second embodiment of this invention digital demodulator.

This invention will now be described referring to embodiments shown in attached drawings. FIG. 1 is a block diagram to show the second embodiment of this invention digital demodulator. FIG. 2 is a block diagram to show the second embodiment of the digital demodulator according to this invention. FIG. 3 is a block diagram to show in more detail the first embodiment of this invention digital demodulator. FIG. 10 is a block diagram to show the second embodiment of this invention digital decoder in detail.

In FIGS. 1 through 3 and 10, a digital demodulator comprises a reference signal generator 400 which generates a predetermined reference signal in accordance with the received phase modulated signals, and a detection circuit 20 which detects said phase modulated signals with the reference signal.

This invention is characterized in that the reference signal generator 400 includes a phase difference detection means 30 which detects the phase difference between said reference signal and said phase modulated signals and outputs the phase difference data, a reference signal phase prediction means 40 which predicts the phase of a reference signal to be set newly and outputs the reference signal phase prediction data selected in accordance with the reception level of said phase modulated signals, a clock generator 50, and a reference signal generating means 51 which takes in said reference signal phase prediction data and generates a reference signal having the designated phase out of input clocks.

Further, the reference signal generator 400 includes a frequency drift detection means 61 which takes in said phase difference data, detects the frequency drift of the carriers of said phase modulated signals from said reference signal and outputs the same as frequency drift data, a frequency drift compensation data generation means 63 which takes in the frequency drift data and outputs the frequency drift compensation data for controlling the phase of said reference signal in accordance with the drift, and an addition means 69 which adds the reference signal phase prediction data outputted from the reference signal phase prediction means 40 and said frequency drift compensation data and transmits the addition data to the reference signal generation means 51.

Further, the phase difference detection means 30 includes a flip-flop 31 and a shift register 33, and the reference signal generating means 51 includes a frequency divider 53, a shift register 55 and a multiplexer 57.

The frequency drift compensation data generation means 63 includes a latch circuit 65 and an adder 67.

The operation of the digital demodulator having the above structure will now be described.

Figure 4:
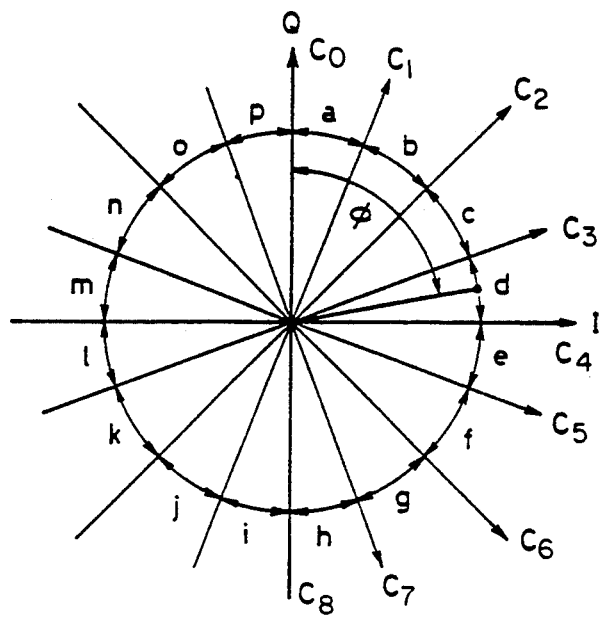
FIG. 4 is an explanatory view to show the operation of the phase difference detection means of the first embodiment of this invention digital demodulator.
Figure 5:
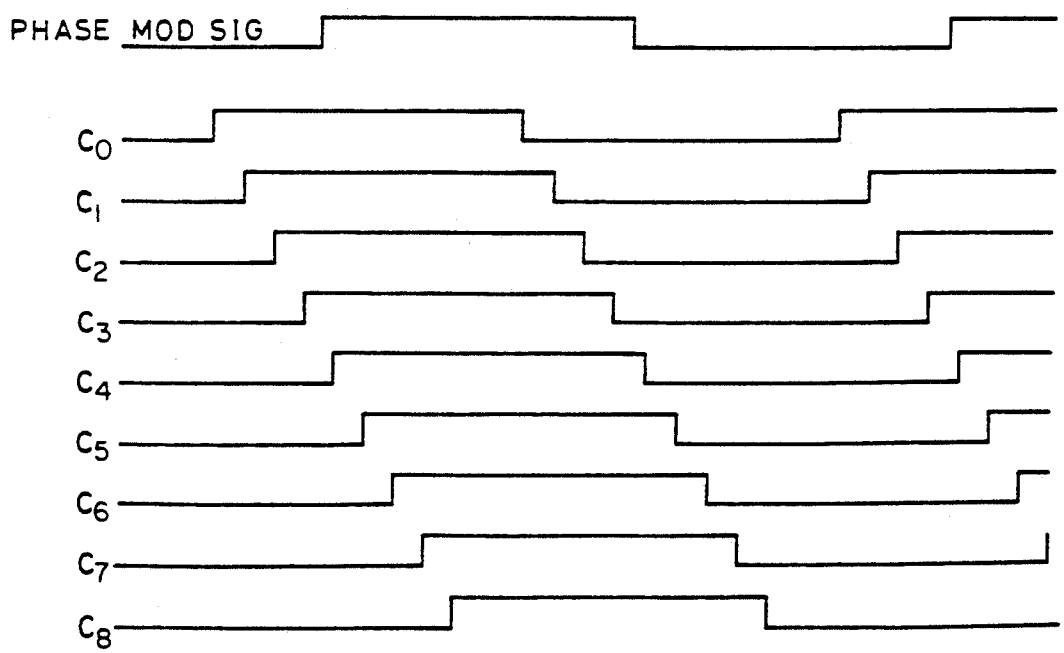
FIG. 5 is a time chart to show signals of the phase difference detection means of the first embodiment of this invention digital demodulator.
Figure 8:
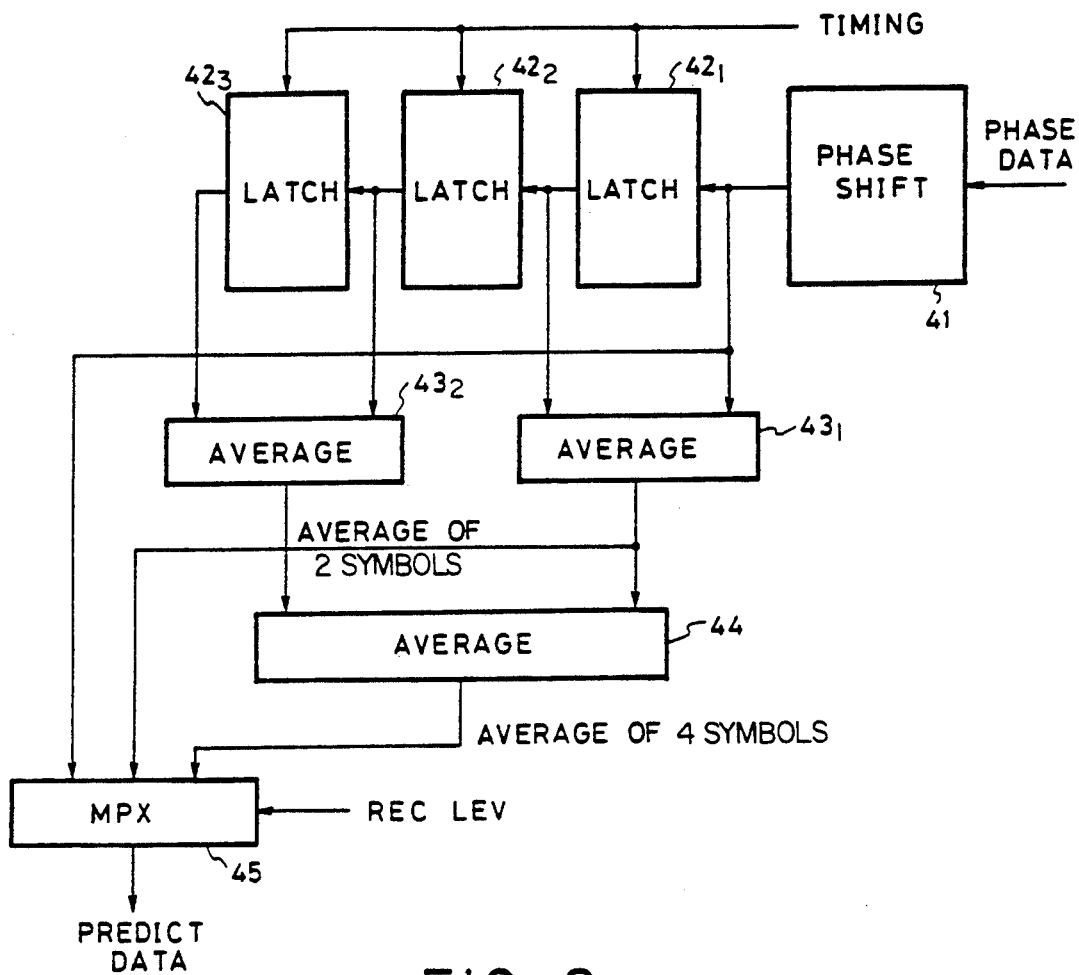
FIG. 8 is a block diagram to show the reference signal phase prediction means of the first embodiment of this invention digital demodulator.
Figure 9:
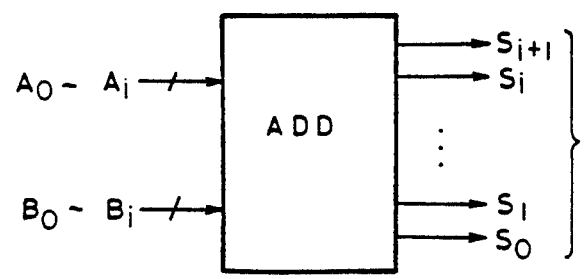
FIG. 9 is a block diagram to show an averaging circuit with an adder in the reference signal phase prediction means of the first embodiment of this invention digital demodulator.
Figure 6:
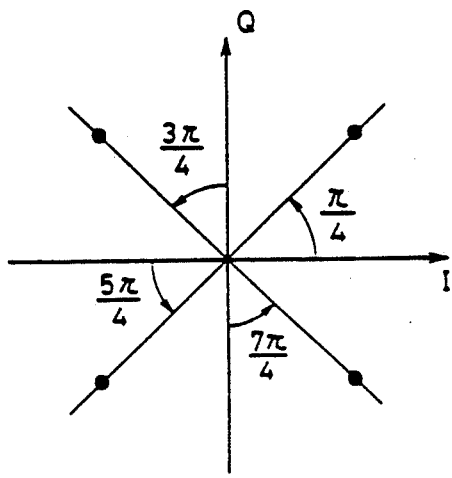
FIG. 6 is a view to show signal phases of a QPSK signal in a signal space.
Figure 7:
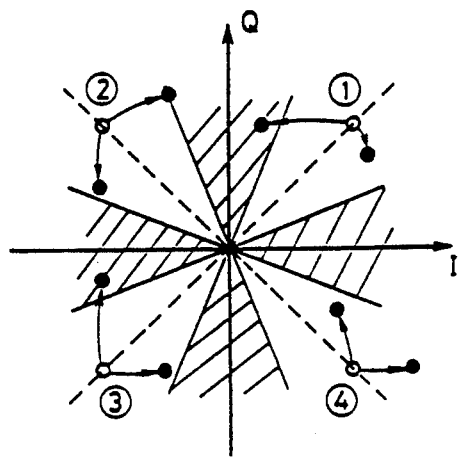
FIG. 7 is a chart to show phases of a QPSK signal when it is passing a circuit where fading exists.
Figure 11:
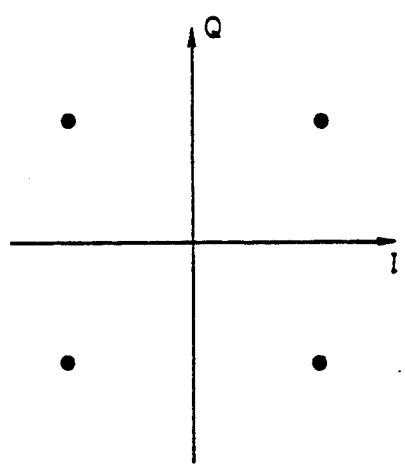
FIG. 11 shows detection phases of a QPSK signal when a frequency drift exists between the carrier of the phase modulated signal and the reference signal.
Figure 11:
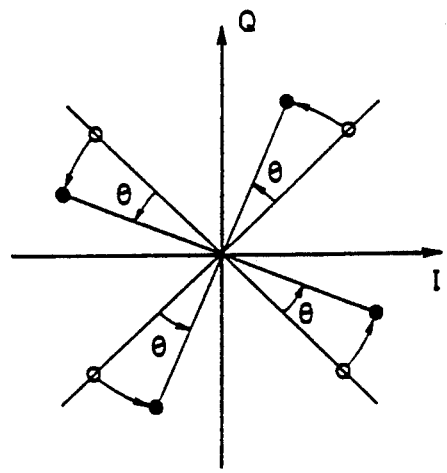

FIG. 4 is a chart to explain the operation of the first embodiment of this invention digital demodulator. FIG. 5 is a time chart of various signals of the phase difference detection means of the first embodiment of the digital demodulator according to this invention. FIG. 6 is a chart to show signal phases in the signal space of a QPSK signal. FIG. 7 is a chart to show the phases of a QPSK signal when it is passing a circuit where fading occurs. FIG. 8 is a block diagram to show the reference signal phase prediction means of the first embodiment of this invention digital demodulator. FIG. 9 is a block diagram to show an averaging circuit using an adder of the reference signal phase prediction means shown in the first embodiment of this invention digital demodulator. FIG. 11 are graphs to show the detected phase of a QPSK signal where frequency drift exists between the carrier of the phase modulated signal and the reference signal.

In FIG. 3, the phase modulated signal inputted at an input 11 is assumed to have been removed of amplitude fluctuations by a limiter and the like and converted into binary-quantized digital signal (of the duty ratio of 50%). Therefore, the input 11 receives signals which are only modulated in phase.

In FIG. 3, the phase modulated signal inputted at the input 11 is detected by a detector 20 with the reference signal having an adjusted phase and the signal obtained by shifting the reference signal by $\pi/2$ phase, and outputted to outputs $13_1$ and $13_2$ as an in-phase signal I and a quadrature signal Q respectively. The reference numeral 21 denotes a $\pi/2$ shift circuit which shifts the reference signal by $\pi/2$ phase. The two reference signals act as reference axes for the phase detection intersecting each other orthogonally similarly to the recovered carrier in coherent detection while flip-flops $23_1$ and $23_2$ act as phase comparators.

The phase modulated signal inputted at the input 11 is branched out and inputted at flip-flops $31_l$ through $31_n$ of the phase difference detection means 30. The reference signal of which the phase has been adjusted is inputted at a shift register 33 of the phase difference detection means 30, and output phase signals $C_l$ through $C_n$ are supplied to the flip-flops $31_l$ through $31_n$ as clocks. The phase difference data $d_l$ through $d_n$ outputted from the flip-flops $31_l$ through $31_n$ are taken in by a reference signal phase prediction means 40 where a reception level (or the transmission condition) is inputted as information for selection.

A clock generator 50 generates clocks of single frequency asynchronously from the carrier of the input phase modulated signal. The clocks outputed from the clock generator 50 are inputted at a frequency divider 53 of the reference signal generating means 51 and a shift register 55 to which a divider output signal from the divider 53 is inputted. Plural phase shifted signals outputted from the shift register 55 are outputted as the reference signal with the re-adjusted phase after going through a multiplexer 57 which selects one of the data based on the reference signal phase prediction data outputted from the reference signal phase prediction means 40.

In the first and second embodiments of this invention, a shift register 33 is used as the phase shift circuit in the phase difference detection means 30, and the clock therefor is utilized as the clock for generating a reference signal in the reference signal generating means 51.

Operations of respective means will now be described.

The flip-flops $31_l$ through $31_n$ receive as clock inputs phase signals $C_l$ through $C_n$ outputted from the shift register 33 and latch the input phase modulated signals respectively. Out of the phase difference data outputted from the flip-flops $31_l$ through $31_n$ are detected the difference between the reference signal whose phase has been readjusted and the phase modulated signal.

For example, if it is assumed that the frequency of the carrier is 44 kHz, and the operation clock of the shift register 33 is 455 kHz $\times$ 16, and a shift register of 8 stages is used, eight phase signals $C_1$ through $C_8$ are obtained by shifting the reference signal by 22.5 (360/16) degrees for each half cycle. One cycle of the reference signal is divided into 16 phase regions as shown in FIG. 4.

When the phase of a received phase modulated signal assumes a value of $\phi$ from the reference $C_0$, it must be positioned between the phase shift signals $C_3$ and $C_4$ (or in the phase shift region d). In other words, as shown in FIG. 5, if the rising edge of the received phase modulated signal is situated between the rising edges of the phase shift signals $C_3$ and $C_4$, the phase difference data $[d_1 d_2 \ldots d_8]$ becomes [00011111]. As the phase difference data differs for each phase of the signal, it becomes possible to obtain the phase difference from the reference signal out of the phase difference data.

The reference signal phase prediction means 40 predicts the phase of a reference signal to be newly set depending on the transmission condition and outputs it as a reference signal phase prediction data for each decision timing to the reference signal generating means 51. This will be descried in more detail hereinafter.

The reference signal generating means 51 sets the frequency of a divider output signal from the divider 53 to be substantially the same as the carrier of the phase modulated signal, and gives a predetermined phase shift to the divider output signal to set the phase of the reference signal. In the first and second embodiment, a shift register 55 is used as the phase shift circuit of the divider output signal. Clock signals generated from the clock generator 50 are supplied to the shift register 55, a predetermined phase shift is given to a divider output signal at the time precision of one cycle thereof, and a multiplexer 57 selects a signal having the phase corresponding to the reference signal phase prediction data from the prediction means 40 out of the plural phase shifted signals thus obtained.

Referring now to FIGS. 6 through 9, the principle, method and structure of embodiments of predicting the phase of a reference signal by the means 40 will be described below.

When a phase modulated signal is a QPSK signal, the phase in a signal space will be shown with four phase points alone as shown in FIG. 6. If the QPSK signal is limited in band by a roll-off filter, the modulated phase smoothly changes centering around the four points. But even in such a case, if it is noted at the optimal decision timing alone, it is still shown with the four phase points. If the phase of the reference signal is set at I axis or Q axis on the side of the demodulation or set at the position where the phase difference from a phase modulated signal is:

$$\pi/4 + k/2$$

(here, k is an integer) the four phases will be stably detected. The uncertainty of $\pi/2$ may be tolerated if the differential coding method is employed.

If the phase difference between the reference signal and a phase modulated signal is not $\pi/4 + k/2$, the phase of the reference signal may be aligned with I or Q axis by detecting the difference and shifting the phase of the reference signal. In this method, the phase shift will be calculated for setting the phase of the reference signal at either I or Q axis based on the phase difference between the reference signal and a phase modulated signal. The calculated phase shift is transmitted to the multiplexer 57 in the reference signal generating means 51 as the reference signal phase prediction data for each decision timing. The phase of the reference signal is adjusted again each time by selecting one of the outputs from the shift register 55.

The principle of prediction has been described for the reference signal. In the case of mobile communication, the phase at decision timings shift from the points 1 through 4 by random FM noises caused by thermal noise or fading. As the phase shift of the reference signal is affected by these noises, it becomes necessary to predict the phase shift which is free of the effect of noises for each timing out of the history of phase shifts calculated in the past for plural decision timings. The prediction methods differ depending on the types of noises. For instance, phase deviations due to thermal noises become random, they should be averaged. In the case where random FM noises exist, because phase errors occur in the same direction alone, the phase should be predicted in a manner to constantly follow suit the phase deviations.

FIGS. 8 and 9 show the reference signal phase prediction means 40 in block diagrams.

The first and second embodiments of this invention are structured taking into consideration the phase difference data for the past four symbols.

In FIG. 8, the phase difference data including the deviations caused by the noises from the phase difference detector 30 is inputted at the phase shift converter 41, and the phase shift for each symbol is calculated. The data is latched by respective latch circuits $42_1$, $42_2$, $43_3$ for each decision timing to obtain the phase shift for four symbols including the latest phase shift. Phase shifts for one symbol, two symbols, and four symbols are obtained from these values by averaging circuits $43_1$ and $43_2$ which average two symbols, and by an averaging circuit 44 which averages four symbols. FIG. 9 shows an adder used as an averaging circuit, which is structured to have inputs $A_0$ through $A_i$ and $B_0$ through $B_i$ and output $S_{i+1}$ through $S_0$ as the output of the averaging circuit.

Generally when the receiving level is low thermal noises become dominant, while when the receiving level is high, random FM noises become dominant. Therefore, the prediction method may be changed utilizing the receiving level as the transmission condition. More specifically, when the receiving level is low, a large number of data should be averaged in order to eliminate the effect of thermal noises. When the receiving level is high, on the other hand, the latest phase shift alone should be used in order to follow the phase noises caused by random FM noises. It is based on the assumption that the phase of the reference signal which is determined by the latest phase shift is closest to the phase on the optimal detection axis at the immediately subsequent decision timing.

In the first and second embodiment, the multiplexer 45 selects the average phase shift of four symbols when the receiving level is low, selects the average phase shift of two symbols when it is medium, and selects the phase shift of one symbol when it is high.

When phase shifts of a still larger number of symbols are averaged, the performance under thermal noises is considered to improve. The operation of averaging may be the method using the least square solution or others. The detection by such averaging operations will show characteristics close to the coherent detection in Costas-loop type.

The method to predict the phase of the reference signal based on the phase shift of one symbol is effective for the case where random FM noises are predominant, and shows characteristics identical to the conventional differential detection which is delayed by one symbol. In that case, if the phase deviation due to random FM noises is predicted at a higher precision utilizing the phase difference data for one symbol, the detection performance can be further improved. As the operation for such highly precise prediction is quite complicated in processing, digital signal processors are usually used. But if the phase of the next symbol can be roughly predicted by detecting several bits of phase deviations, a circuit of simple structure can be constructed using the information on such phase deviations as addresses and a memory which stores predicted values of the next symbol phase.

Although description has been made in relation to QPSK signals, the first and second embodiments as above may be applicable to modulated signals of which detection phase is known such as multi-phase PSK signals. The same may be applied to the case of $\pi/4$ shift QPSK signals which are obtained by shifting the phase of QPSK signals in a given direction by $\pi/4$ for each decision timing. More specifically, as the phase of the modulated signal shifts by $\pi/4$ after decision timing, if the axis which is the reference of detection is shifted by $\pi/4$, the phase shift of the signal when viewed from the detection axis becomes equivalent to QPSK signals. Therefore, when a $\pi/4$ shift QPSK signal is detected by this circuit, the frequency should be changed so that the reference signal which is the detection axis is to be shifted by $\pi/4$ for each decision timing. This is made simply by changing the clock frequency of the clock generator 50. When it is applied to PSK signals of eight or higher phases, the number of detection axes of the detector 20 should be increased.

The embodiment is applicable not only to the operation as a coherent detector or a differential detector of the conventional Costas-loop type but also to other detection operations and is further is adaptable to the transmission conditions as it can be changed in detection method. The circuits can be realized as fully digitized integrated circuits.

When the frequency drift between the reference signals and the phase modulated signal increases, even if the phase of the reference signal at the immediately subsequent timing is predicted by the means 40, the phase may be shifted by the frequency drift during one symbol before the next timing to impair stable detection performance. In such a case, it is necessary to offset the phase deviation in the reference signal caused by the frequency drift.

The digital demodulator shown in FIG. 10 generates data which would offset the phase deviation of the reference signal caused by frequency drift, adds the data to the reference signal phase prediction data and then inputs the sum to the generating means 51 based on the frequency drift data which has been detected.

FIG. 10 shows only the additional components which are not shown in the basic structure of the digital demodulator in FIG. 3.

In FIG. 10, a frequency drift detection means 61 which detects the frequency drift data out of the phase difference data outputted from the phase difference detection means 30, and transmits it to a frequency drift compensation data generation means 63.

The phases of the reference signal and of the phase modulated signal at a decision timing are in a predetermined relation in case of QPSK signals free of noises as shown in FIG. 11(a). If a frequency drift exists between the reference signal and the carrier of the phase modulated signal, the phase of the modulated signal is caused to rotate constantly in one direction as shown in FIG. 11(b) and becomes detected. As the shift $\theta$ is proportionate to the frequency drift, the drift can be determined by observing the shift $\theta$. It is possible to detect if only they are averaged for several symbols even if there are noises.

The reference signal adjusted of its phase and outputted from the reference signal generating means 51 is branched out and is inputted at a clock terminal of the latch circuit 65 of the data generation means for frequency drift compensation 63. The output is decimal from the latch circuit 65 is inputted at an adder 67 together with the frequency drift data $\alpha$ outputted from the frequency drift detection means 61, and the output therefrom is inputted at the latch circuit 65. The output in integer from the latch circuit 65 is added to the reference signal phase prediction data outputted from the reference signal phase prediction means 40 by an adder 69, and supplied to a multiplexer 57 of the reference signal control means 51.

Given the clock frequency $f_0$ of the clock generator 50 and the frequency $f_r$ of the reference signal, a relation holds as below.

$$f_0/f_r = m$$

wherein m is a division ratio of the divider 53. If the frequency of the reference signal $f_r$ is substantially the same as the carrier frequency $f_c$, the division ratio m of the frequency divider 53 may be fixed. However, if there is frequency drift therebetween, the frequency division ratio should be as below, $$f_c f_0/f_r = m + \alpha (\alpha < 1)$$

in order to make the frequency $f_r$ of the reference signal to be the carrier frequency. If the output clocks from the divider 50 are continued to be divided by a division ratio m, there will be an error of $\alpha$ in the division ratio each time waveforms of the reference signal for cycle are obtained.

Therefore, errors "$\alpha$" are added for each cycle of the reference signal by an adder 67 and the latch circuit 65, and if its absolute value becomes "1" or more, the value is added to the reference signal phase prediction data outputted from the reference signal phase prediction means 40 via the adder 69 to adjust the phase shift of the reference signal outputted from the reference signal generating means 51. In this manner, the phase shift caused by frequency drift can be offset.

Besides the structure of this embodiment, an output for compensating frequency drift may be obtained by directly changing the reference signal phase prediction data at the prediction means 40. More specifically, the reference signal phase prediction data is adjusted for each symbol in order to offset the shift in the predicted phase caused by the frequency drift during one symbol. As the reference signal phase prediction data are outputted for each decision timing from the means 40, when one cycle of a symbol is long, the phase errors might increase to deteriorate detection performance. Therefore, this method is effective when the phase errors in one symbol remain in the tolerable scope.

The frequency drift data $\alpha$ may be detected by measuring the received frequency with the output clocks from the clock generator 50. This method is quite effective in detection of frequency drift at a high speed.

If the level of a modulated signal becomes too low to be received in the data generation means 63, correct data for compensating frequency drift would not be obtained due to noises, and phases becomes incoherent to thereby deteriorate detection performance. In such a case, in order to prevent such deviation from coherency, the value of the compensation data may be frozen as it is by a control signal sent from outside.

Moreover, if the scope of output data is too large, signals would be locked at a wrong frequency (which is called a false lock). Therefore, the value in the data should be controlled not to exceed a predetermined scope.

Figure 12:
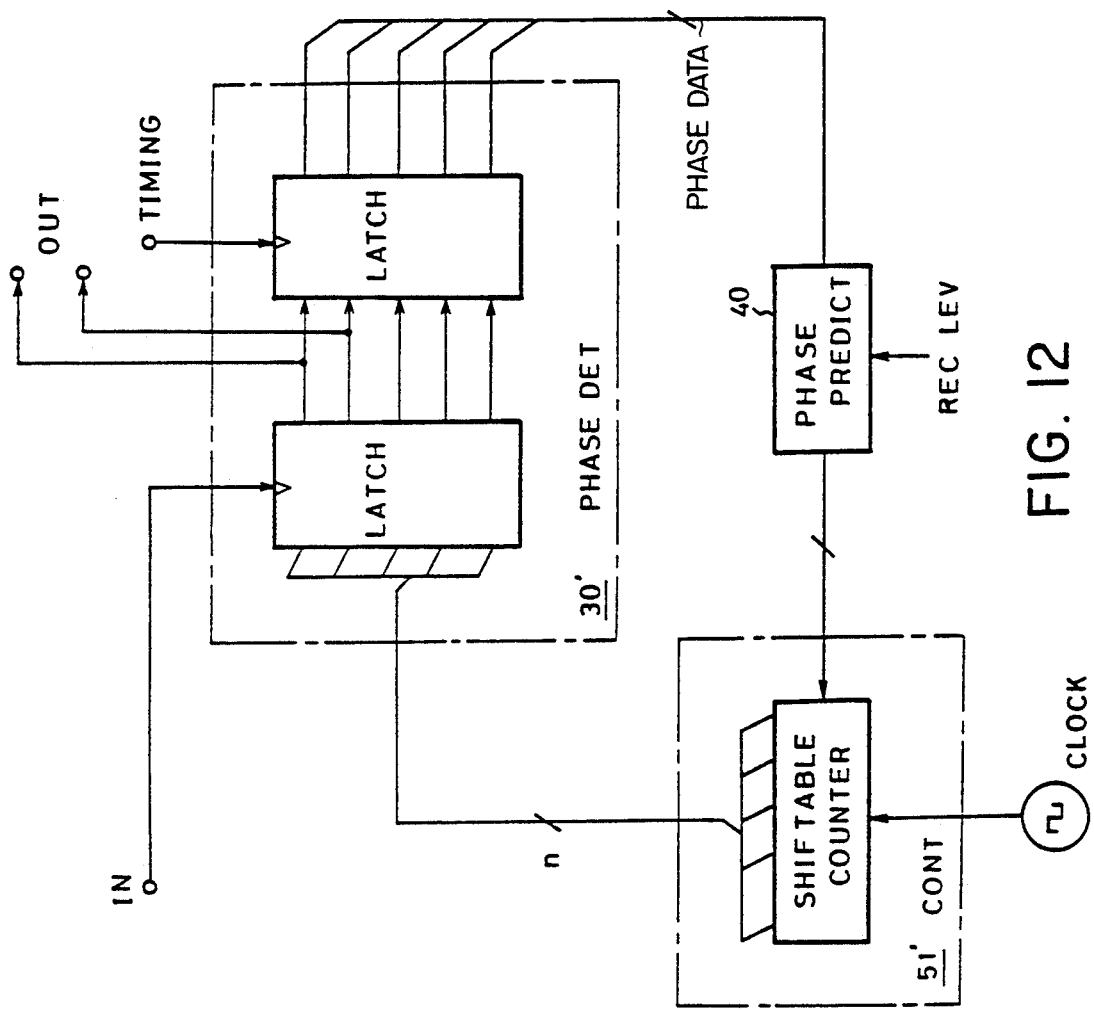
FIG. 12 is a block diagram to show another phase difference detection means of the first and second embodiments of this invention digital demodulator.
Figures 13A, 13B:
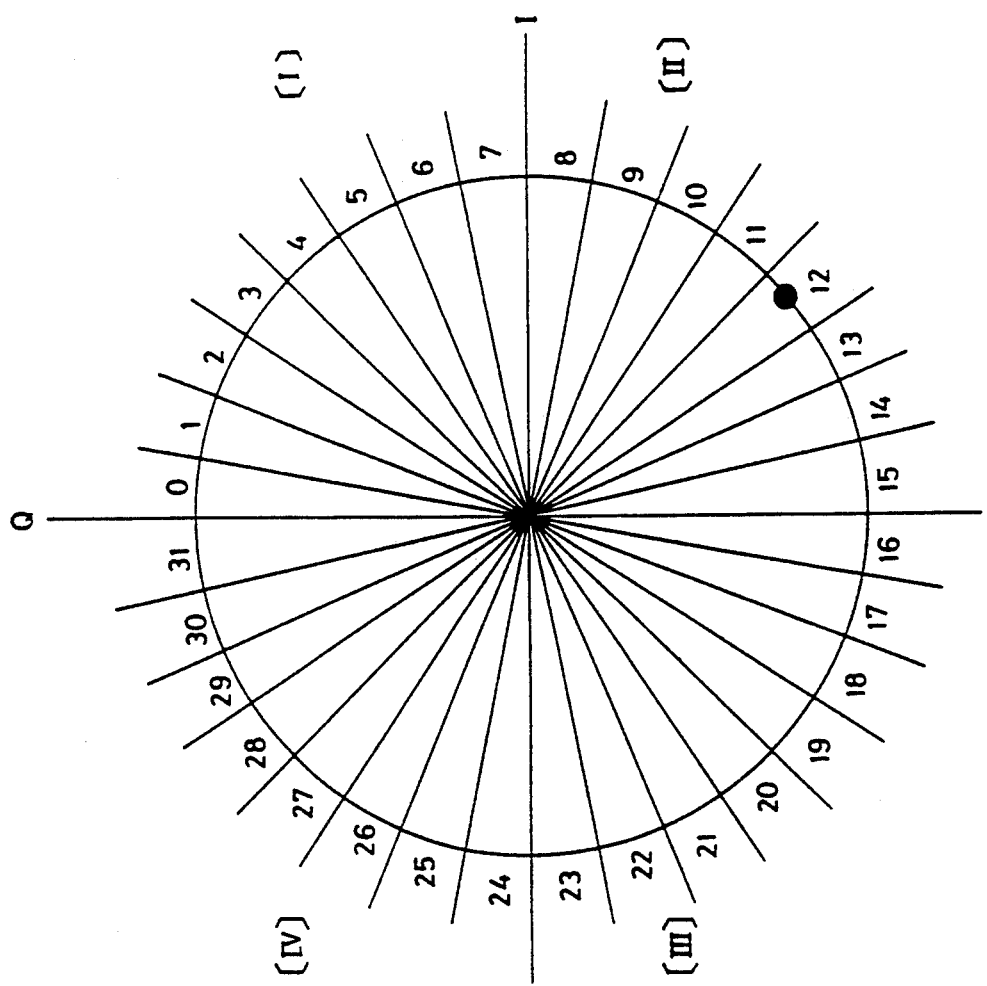
FIG. 13 shows the operation of the other phase difference detection means of the first and second embodiments of this invention digital demodulator.
Figure 14:
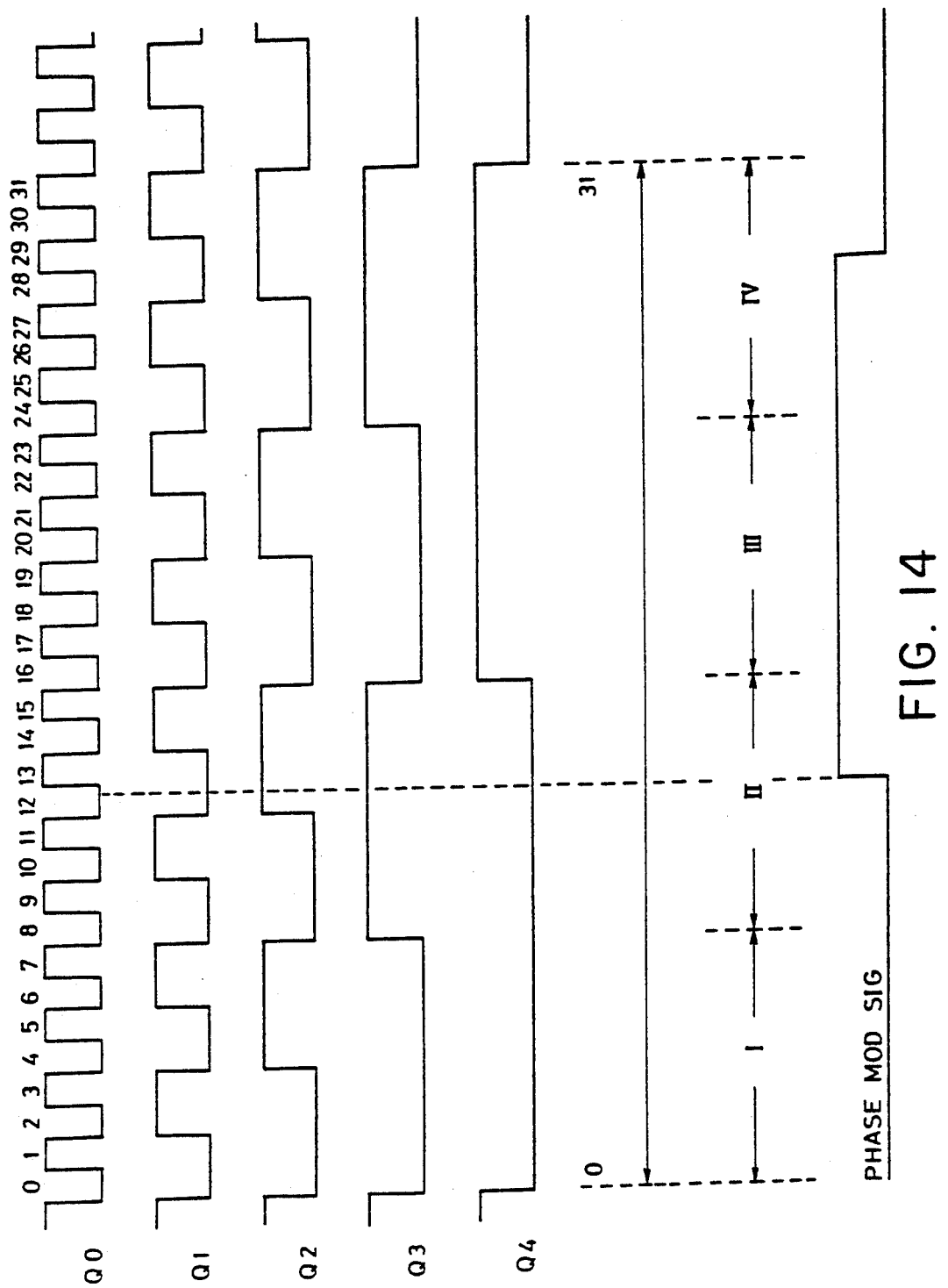
FIG. 14 is a time chart to show various signals of the other phase difference detection means of the first and second embodiments of this invention digital demodulator.

FIG. 12 is a block diagram to show another phase detection means for the first and second embodiments of this invention digital demodulator. FIG. 13 shows the operation of this another phase detector means. FIG. 14 is a time chart to show various signals at the phase detector.

In FIG. 12, the reference signal control means comprises a counter with shift function. The phase difference detector means comprises two latches. The principle of their operations is shown in FIGS. 13 and 14. The output in n bit from the counter shows the phase obtained by dividing the carrier by $2^n$. By latching the n bit value outputted from the counter with shift function with the phase modulated signal, the phase of the phase modulated signal as relative to the reference signal outputted from the counter may be learned. The value obtained by latching the phase data for each symbol timing is used as a phase difference data. Other operations are similar to the ones described for the first embodiment as shown FIG. 3.

As mentioned above, the first and second embodiments can realize the operations of detection of phase modulated signals, recovery of carriers for detection and frequency drift compensation with digital circuits. More specifically, without requiring a filter for carrier extraction, voltage controlled oscillator, analog/digital converter, and other analog parts including delay line, all of these operations can be realized as a complete one-chip digital integrated circuit simply by adding a fixed oscillator externally. As the circuit needs no adjustment and operates with lower power consumption, the cost can be reduced.

The first and second embodiments of this invention digital demodulator may be used for modulated signals of which detection phases that are possible at the time of decision are known. If the phase of the reference signal is properly controlled, the present invention may be used for the conventional Costas-loop type coherent detection, differential detection or other detections. The detection method may be modified to suit the transmission condition. Frequency drift may be compensated only by controlling the phase of the reference signal, to secure stable detection constantly.

Figure 15:
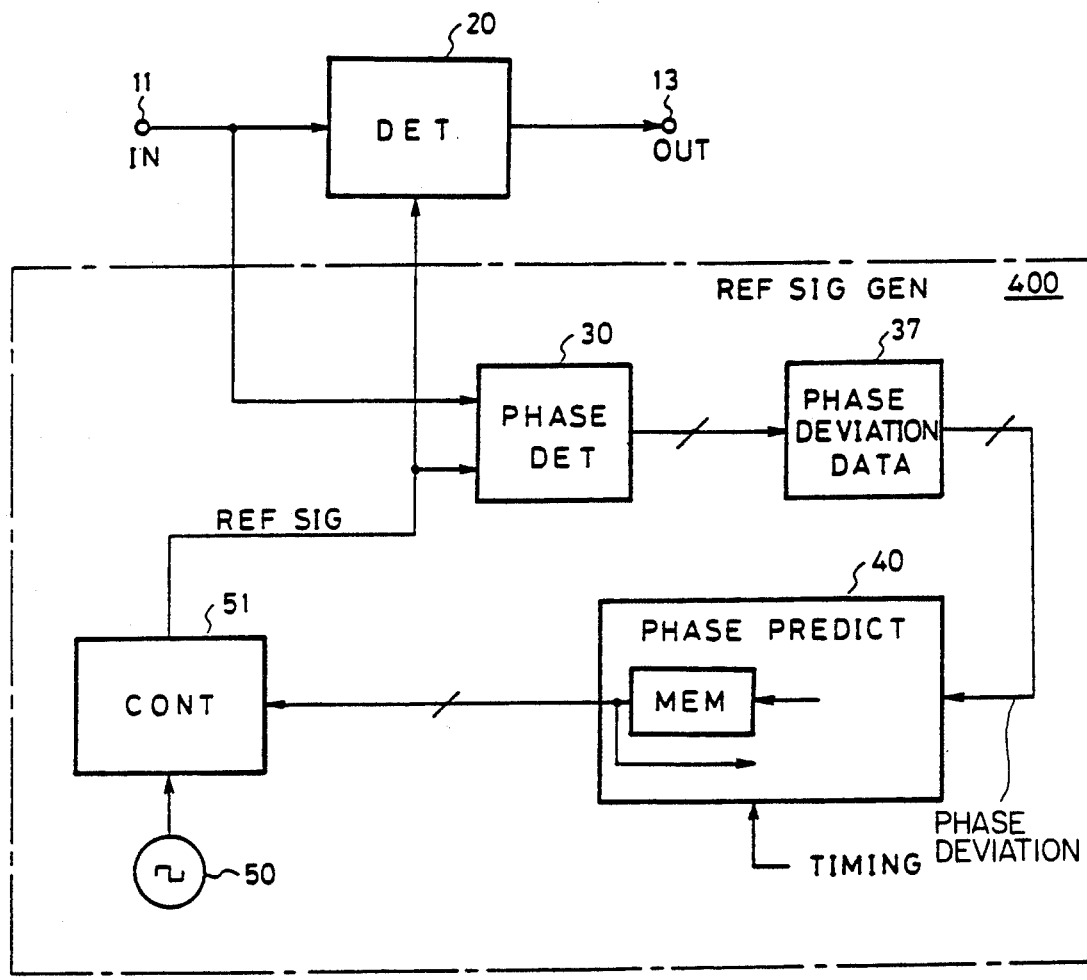
FIG. 15 is a block diagram to show the third embodiment of this invention digital demodulator.
Figure 16:
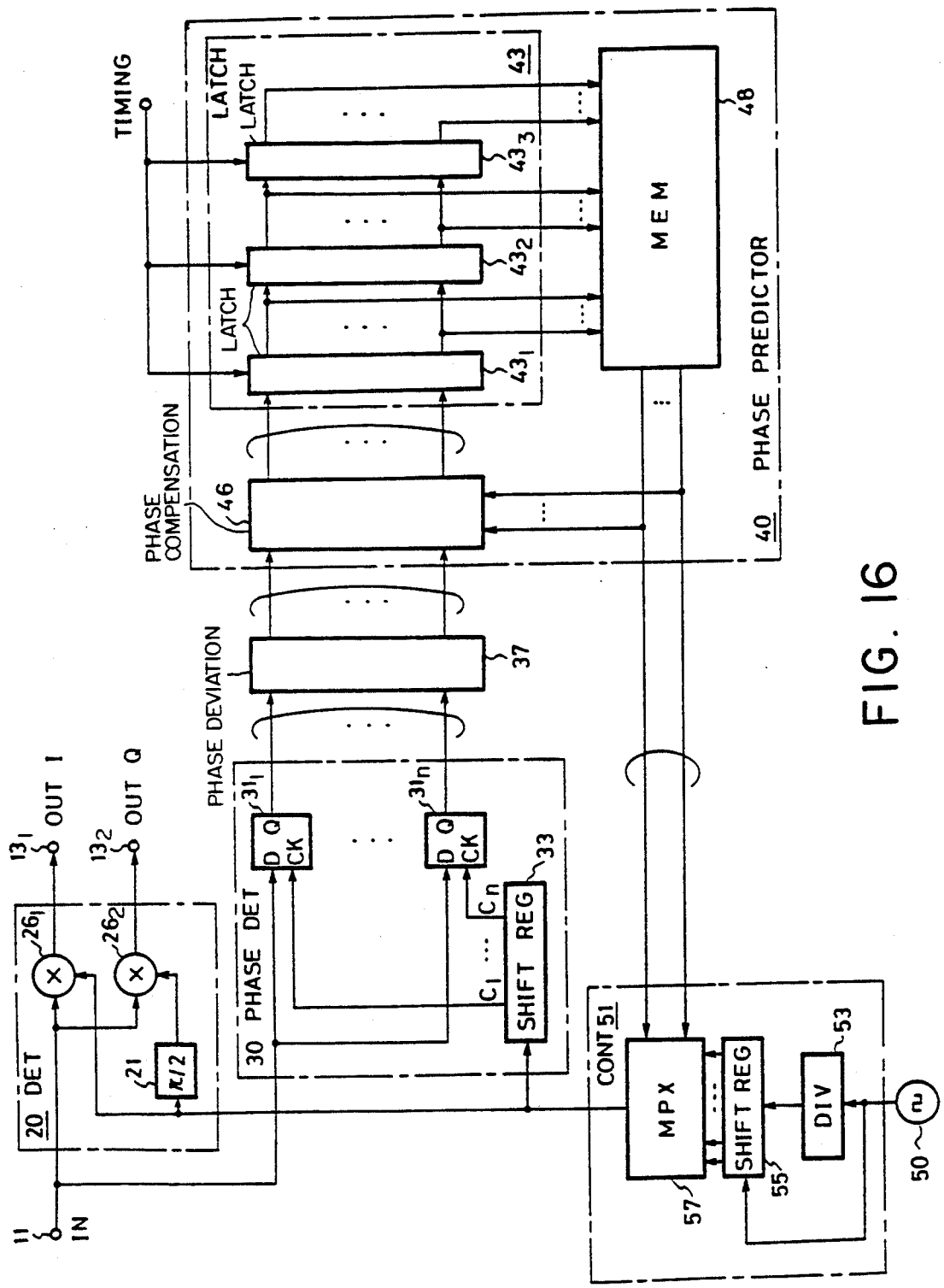
FIG. 16 is a block diagram to show in more detail the third embodiment of this invention digital demodulator.

FIG. 15 is a block diagram to show the third embodiment of digital demodulator of this invention. FIG. 16 is a block diagram to show in more detail the third embodiment of the digital demodulator of this invention. In the third embodiment, it is assumed that the phase modulated signals inputted at the input 11 are the signals which have been removed of amplitude changes by a limiter and the like, and converted into binary quantized digital signals (of which duty ratio is 50%). The input 11 receives them as input as the signals which are only modulated in phase.

In FIG. 16, a phase modulated signal inputted at the input 11 is detected by the reference signal of which phase is readjusted by multipliers $26_1$ and $26_2$ of the detector 20 and by the signal obtained by shifting the phase of said reference signal by $\pi/2$, and outputted to the outputs $13_1$ and $13_2$ as the detection signal I and detection signal Q respectively. The reference numeral 23 denotes a $\pi/2$ shift circuit which shifts the reference signal by $\pi/2$. Two reference signals act as detection axes which intersect each other at normal angles just like the recovered carrier in the coherent detection. The structure is intended for QPSK signals, but the third embodiment is similarly effective for other coherent detectors.

The phase modulated signal inputted at the input 11 is branched out and inputted at flip-flops $31_l$ through $31_n$ of the phase difference detection means 30. The reference signal which has been adjusted in phase is inputted at a phase shift circuit 33 of the means 30, and the outputs $C_l$ through $C_n$ are supplied as clocks to the flip-flops $31_l$ through $31_n$. The phase difference data from the flip-flops $31_l$ through $31_n$ between the phase modulated signal and the reference signal of which phase has been readjusted are taken in by the phase deviation data conversion means 37.

The phase deviation data conversion means 37 converts the phase difference data into a data on deviation from the modulated phase which should essentially be assumed at the time of decision, and the phase deviation data is transmitted to the reference signal phase prediction means 40.

The prediction means 40 comprises a phase compensation circuit 46, a latch circuit 43 and a memory 48. The phase compensation circuit 46 is inputted with the phase deviation data as well as the reference signal phase prediction data outputted from the memory 48, which are in turn converted into and outputted as carrier phase deviation data corresponding to the carrier phase deviated in one symbol. The latch circuit 43 includes latch circuits $43_1$ through $43_3$ which hold carrier phase deviation data over several symbols corresponding to signals at respective decision timings, and outputs the output from respective latches as the address for the memory 48 (carrier phase deviation data for several symbols). The memory 48 stores the reference signal phase prediction data at the timing for decision the following symbol using the carrier phase deviation data over several symbols as the addresses.

The clock generator 50 generates clocks of single frequency asynchronously from the carrier of input phase modulated signal. The clocks generated from the generator 50 are inputted at the frequency divider 53 of the reference signal generating means 51 and the shift register 55 which inputs the output signals from the divider 53. The plural signals out of the shift register 55 which have been phase shifted are passed through a multiplexer 57 which selects one out of the reference signal phase prediction data outputted from the memory 48 of the means 40 and are outputted as the reference signal of which the phase has been readjusted.

Operations of respective means will now be described.

Figure 17:
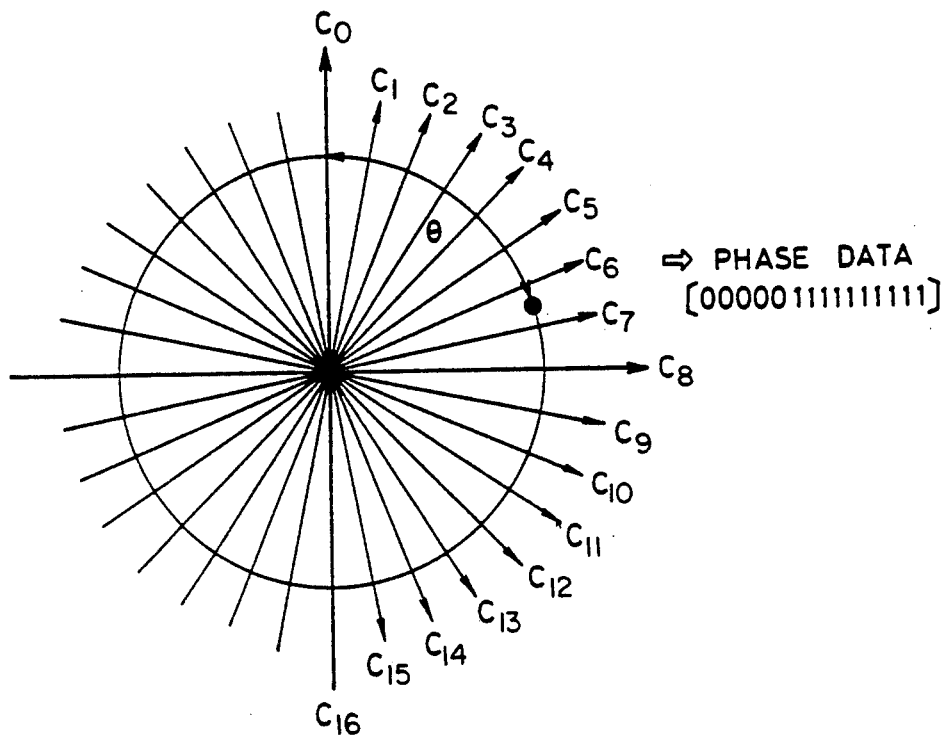
FIG. 17 is a chart to explain the operation of the phase difference detection means of the third embodiment of this invention digital demodulator.
Figure 18:
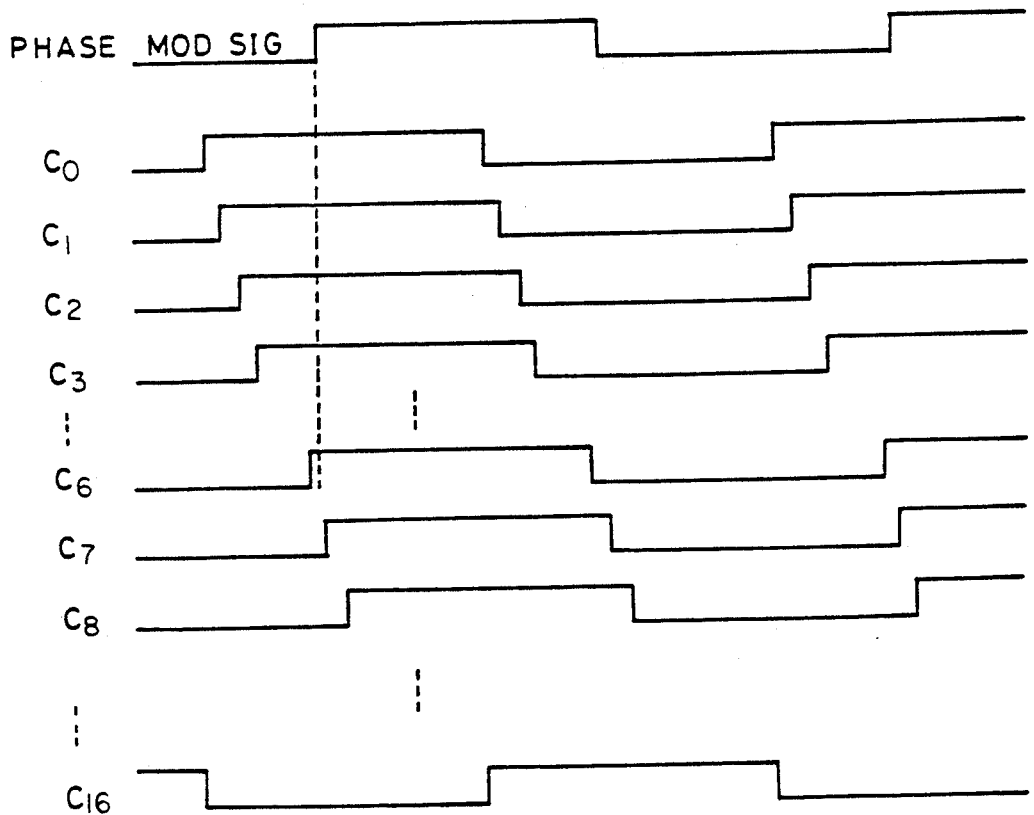
FIG. 18 is a time chart of various signals of the phase difference detection means of the third embodiment of this invention digital demodulator.
Figure 19:
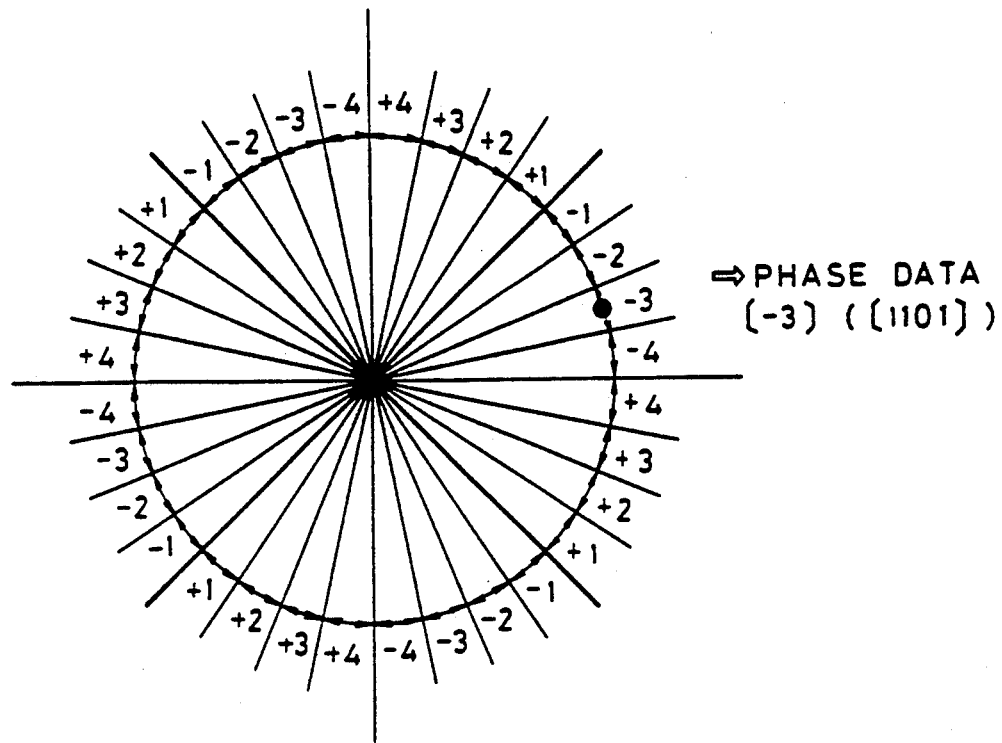
FIG. 19 is an explanatory view to show the operation of the phase deviation data generation means of the third embodiment of this invention digital demodulator.
Figure 20:
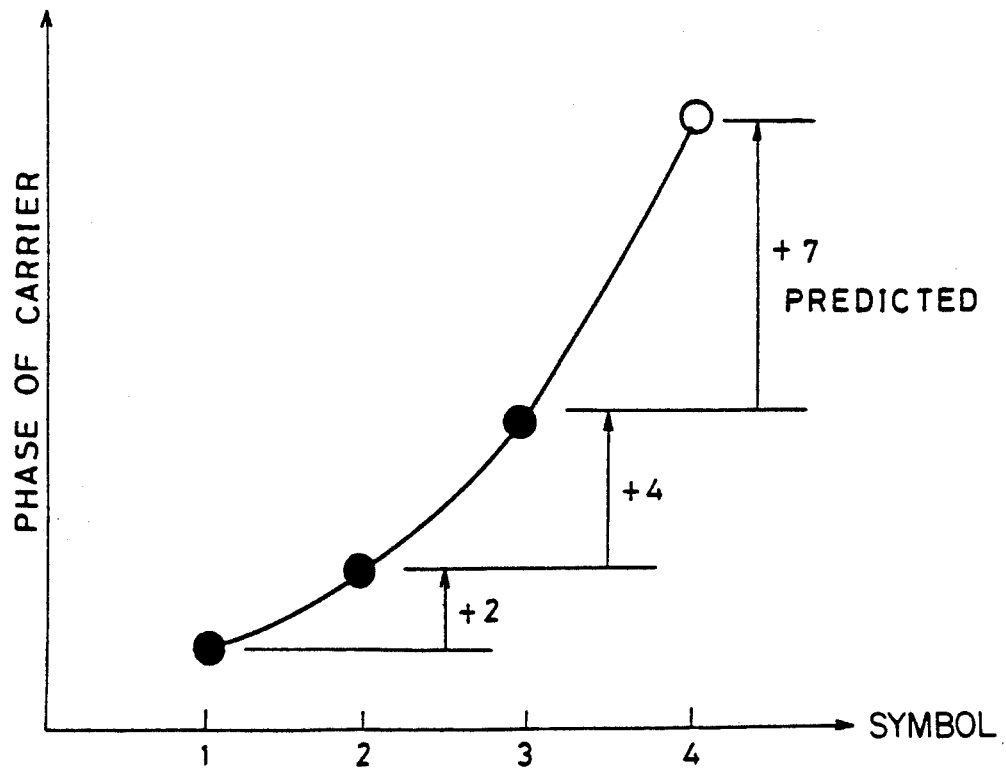
FIG. 20 is a graph to show phase shift of a carrier under random FM noises.

FIG. 17 is a view to explain the operation of the phase difference detection means of the third embodiment digital demodulator of this invention. FIG. 18 is a time chart of various signals of the phase difference detection means of the third embodiment of the digital demodulator. FIG. 19 is a view to explain the converting operation by the phase deviation data conversion by the third embodiment. FIG. 20 is a view to show the phase shift of carriers under random FM noises.

In FIG. 16, the flip-flops $31_l$ through $31_n$ of the means 30 latch respective phase modulated signals that are inputted using the phase signals $C_l$ through $C_n$ outputted from the shift register 33 as the input clocks. Based on the data outputted from the flip-flops $31_l$ through $31_n$, the difference in phase between the reference signal of which the phase has been readjusted and the phase modulated signal can be detected.

For instance, if it is assumed that the frequency of the carrier is 455 kHz and that shift registers in 16 stages having the operational clocks of 455 kHz × 32 are used as the shift register 33, 16 phase shift signals $C_1$ through $C_{16}$ which have been obtained by shifting the half cycle of the reference signal by 11.25 (360/32) degrees are obtained. As shown in FIG. 17, one cycle of the reference signal is divided into 32 phase regions by these phase shift signals $C_1$ through $C_{16}$. The cycle may further be divided into a larger number of phase regions if the operation clocks of the phase shift circuit (shift register) 33 is made faster.

If the modulated phase of a received phase modulated signal assumes a value $\theta$ with respect to the shift signal $C_0$ as the reference as shown in FIG. 17, it comes between the phase shift signals $C_6$ and $C_7$. More specifically, when the rising edge of a received phase modulated signal is positioned between the rising edges of the phase shift signals $C_6$ and $C_7$, the phase difference data $[d_1 d_2 \ldots d_{16}]$ outputted from the flip-flops $31_l$ through $31_n$ (n=16) becomes [0000001111111111]. As the phase difference data differs depending on the phase of a received phase modulated signal, it becomes possible to obtain the phase difference between the phase modulated signal and the reference signal.

A similar effect may be achieved if a phase modulated signal is shifted in phase, and the reference signal of which phase is readjusted with these signals is latched. As the detection signal I outputted from a detection circuit 20 is a function of $\cos\phi$, and the detection signal Q can be expressed with the function of $\sin\phi$, the same effect may be obtained by calculating the arc tan ($\phi$) from respective signals.

The phase deviation data conversion means 37 converts the phase difference obtained by the means 30 into deviation from the four modulated phase points ($\pi/4$, $3\pi/4$, $5\pi/4$, $7\pi/4$) shown with bold lines in FIG. 19 in case of QPSK signals. For example, when the phase modulated signal shown in FIG. 18 is inputted and the phase difference data of [0000001111111111] is obtained, the data is converted into the phase deviation data of [−3] or [1101] in binary number. This conversion may be realized with a simple logical operation circuit. This operation enables the phase difference between the modulated phase of the carrier and the reference signal to be obtained irrespective of any of the four modulated phases.

The reference signal phase prediction means 40 predicts the phase of a reference signal which is to be newly set based on the phase difference data of the past, and outputs it as the prediction data to the reference signal generating means 51 for each decision timing.

The operation of the prediction means 40 will now be described in more detail.

When random FM noises occur under fading, the phase of carriers deviates chronologically. FIG. 20 shows an example where relative value of carrier phase is plotted on the vertical axis, and time in the unit of a symbol on the horizontal axis.

In the conventional differential detector which detects signals by referring to the phase of the carrier of one symbol before, when the carrier phase deviates in that one symbol by more than 45 degrees, an error occurs. The third embodiment of this invention demodulator has a reference signal phase prediction means 40 which predicts the phase of the carrier of the subsequent symbol based on the past phase deviations thereof and readjusts the phase of the reference signal based on the prediction. Instead of the feed back operation of the prior art which eliminates detected phase difference, it predicts the phase shift which might be caused by random FM noises, and sets a phase for the reference signal so that the phase deviations will be offset in the next symbol. It may be called as a "feed forward" operation against the feed back operation of the prior art. Even when the phase deviates by more than 45 degrees in one symbol, this invention means prevents generation of errors by predicting such deviations.

The memory 48 of the means 40 stores the reference signal phase prediction data for the decision timing in the next symbol using as an address the data indicating the phase deviations of the carrier in the past m symbols. In other words, if the phase deviations of the carrier are obtained for the past m symbols, the phase of the reference signal (carrier in the case of coherent detection) in the immediately following symbol may be predicted by the memory 48.

For example, as shown in FIG. 20, if the phase deviation between the first and the second symbols is +2, and that between the second and the third symbols is +4, the phase deviation between the third and the fourth symbols can be predicted as +7. If this prediction is correct, the phase difference in the following symbol between the phase modulated signal and the reference signal of which the phase has been adjusted based on the prediction becomes substantially equal to $\pi/4 \pm i \times \pi/2$, and the phase deviation data becomes 0. As the phase deviation of the carrier at this time becomes equal to the predicted value (or the reference signal phase prediction data), the value is set at the latch circuit 43 as a new input address.

When the prediction is wrong, on the other hand, the phase difference between the phase modulated signal and the reference signal deviates from $\pi/4 \pm i \times \pi/2$, and the error or the portion which could not be predicted in the carrier phase deviation is detected as the phase deviation data. Therefore, the phase deviation of the carrier which actually took place may be calculated simply by adding the error portion and the prediction made by the memory 48 by the phase compensation circuit 46. If the predicted value is too large, the phase deviates in the negative direction. But if the data is expressed in terms of complements, the phase deviation in the carrier may also be obtained by a simple addition.

In the third embodiment, the latch circuits $43_1$ through $43_3$ are used as the latch circuit 43, and the carrier phase deviation data for three symbols are held.

The reference signal phase prediction data stored in the memory 48 may be determined either based on the phase deviations of the carrier measured in advance, or by mathematical calculation such as spline interpolation using the carrier phase deviation data at plural decision timings.

The reference signal generating means 51 sets the frequency of the output signal from the frequency divider 53 to be substantially equal to the carrier of the phase modulated signal, and the phase of the reference signal is adjusted by giving a predetermined shift to the phase of the divided signal. In the third embodiment a shift register 55 is used as the phase shift circuit for frequency divided signals, clocks outputted from the clock generator 50 are supplied to the shift register 55, a predetermined phase shift is given to the divider output signals at the time precision of one cycle, and a multiplexer 57 selects out of thus obtained plural phase shifted signals a signal having the phase corresponding to the reference signal phase prediction data outputted from the means 40.

With such structure, even when the carrier phase deviates by more than 45 degrees in one symbol under random FM noises, the phase modulated signal may be detected with a properly predicted reference signal to thereby reduce errors.

Figure 21:
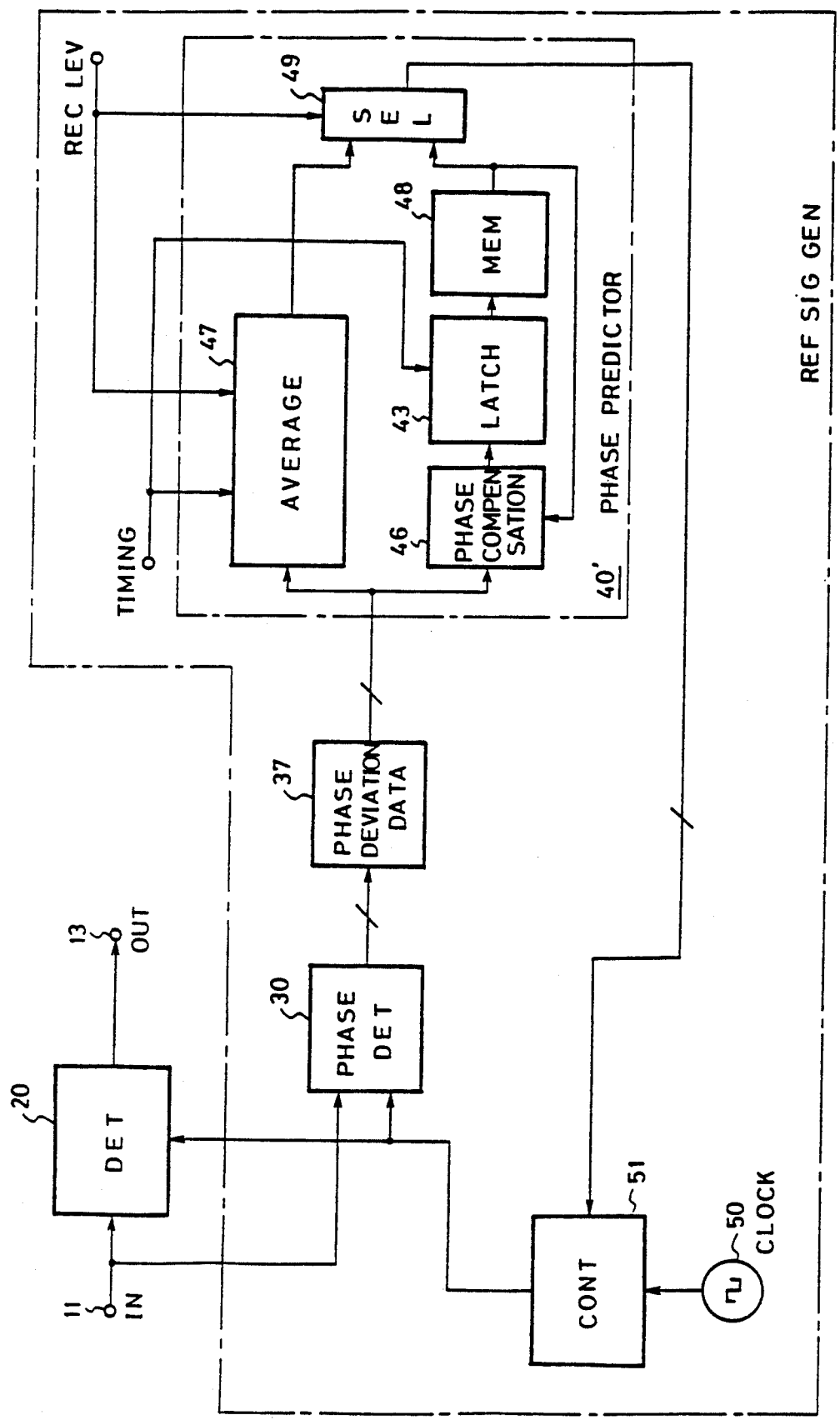
FIG. 21 is a block diagram to show the fourth embodiment of this invention digital demodulator in detail.
Figure 22:
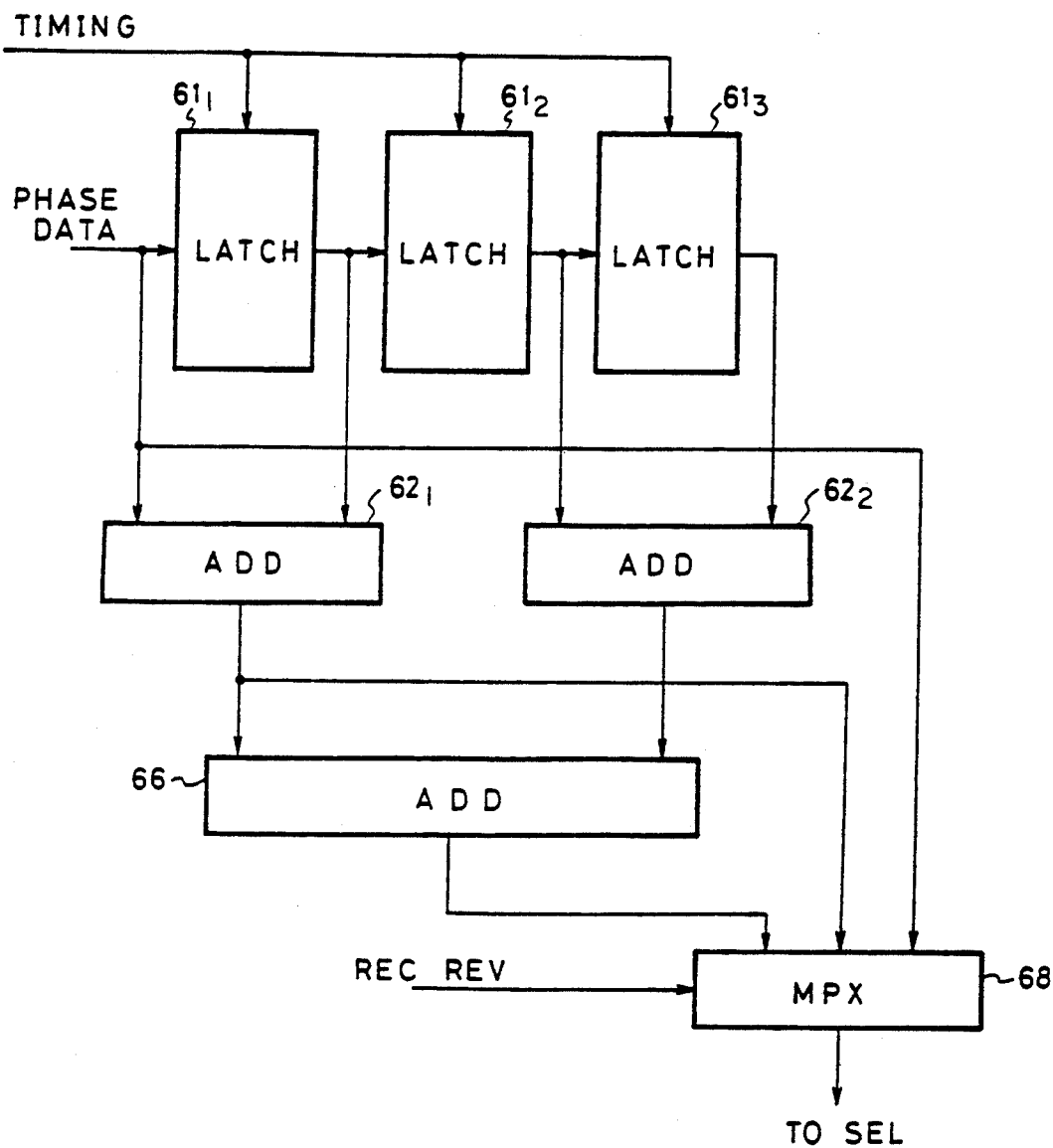
FIG. 22 is a block diagram to show an averaging circuit of the fourth embodiment of this invention digital demodulator.

FIG. 21 is a block diagram to show the fourth embodiment of this invention digital demodulator. FIG. 22 is a block diagram to show an averaging circuit of the fourth embodiment digital demodulator.

The fourth embodiment is structured similarly to the one shown in FIG. 16 for the detector 20, the phase difference detection means 30, the phase deviation data conversion means 37, the clock generator 50 and the reference signal generating means 51, and differs only in the structure of the reference signal phase prediction means 40'.

In addition to the phase compensation circuit 46, the latch circuit 43 and the memory 48 of the prediction means 40, the reference signal phase prediction means 40' comprises an averaging circuit 47 which receives as an input the phase deviation data and a selector circuit 49 which selects either one of the output from the averaging circuit 47 or the output from the memory 46 and outputs it as the reference signal phase prediction data. The averaging circuit 47 and latch circuit 43 receive as an input the decision timing signals and the averaging circuit 47 and the selector circuit 49 receive as an input the reception level data which indicates the transmission conditions.

The averaging circuit 47 averages the phase deviation data over the past decision timings of the number n, and outputs the result as the reference signal phase average data. Two data expressed in binary number may be averaged by means of an adder which adds the two data and then takes out the data which is shifted by one bit in the direction of least significant bit. The number n may be increased to 4, 8 and 16 by combining them. An example of such averaging circuit where n=4 is shown in FIG. 22.

In FIG. 22, the phase deviation data is latched for each decision timing at the latch circuits $61_1$, $61_2$ and $61_3$ respectively, and phase shifts for four symbols including the latest phase shift may be obtained. Shift for one symbol and average shifts, two symbols and four symbols may be obtained by adders $62_1$, $62_2$ which average them for two symbols and by an adder 66 which average them for four symbols.

Generally speaking, when the reception level is low, thermal noises become dominant while when it is high, random FM noises become dominant. Prediction method may be modified adaptively to the transmission condition which is learned in terms of the reception levels. More specifically, when the reception level is low, a large number of data should be averaged in order to eliminate the effect of thermal noises. When the level is high, only the latest phase shift should be used to follow the phase noises caused by random FM noises. This is based on the assumption that the phase of the reference signal which is determinable with the latest phase shift is closest to the phase of the optimal detection axis at the next decision timing.

Here, the multiplexer 68 selects a method which uses the average phase shift for four symbols when the reception level is low, a method which was the average phase shift for two symbols when the level is medium, and a method which uses the phase shift for one symbol when the level is high.

The reference signal phase prediction means 40' using such averaging circuit 47 selects the output data either from the memory 48 or from the averaging circuit 47 depending on the reception level, and transmits the same as the reference signal phase prediction data at the next timing to the reference signal generation means 51.

More specifically, by reducing the number of samples n for averaging by the averaging circuit 47 as the reception level increases, and by selecting the output from the memory 48 when the reception level becomes high enough to allow random FM noises to be predominant, the bit error rate performance comparable to that in the coherent detection is obtained in the low level reception region while the performance superior to that in the coherent or differential detection can be obtained in the high level reception region.

Although this invention embodiments have been described in terms of QPSK signals, the third and fourth embodiments are applicable to other modulated signals such as multi-phase PSK of which the detection phase is known. When they are applied to PSK signals of eight phases or more, they can be adapted by increasing the number of detection axes in the detection circuit 20.

As mentioned above, as the third and fourth embodiments can make the phase of the reference signal to follow the phase deviation caused by random FM noises, detection performance is improved and the data error rate is reduced.

By structuring the system to select optimally the reference signal phase prediction means depending on the transmission conditions such as the reception level, this system can achieve excellent detection performance (or bit error rate performance) over a wide scope of reception levels.

The reference signal phase prediction means used in the third and fourth embodiments of this invention may be realized with memories and other digital circuits. Compared with other structures which utilize address circuits or digital signal processors, this invention prediction means can be easily simplified, needs no adjustment, requires lower power, and costs less.

Figure 23:
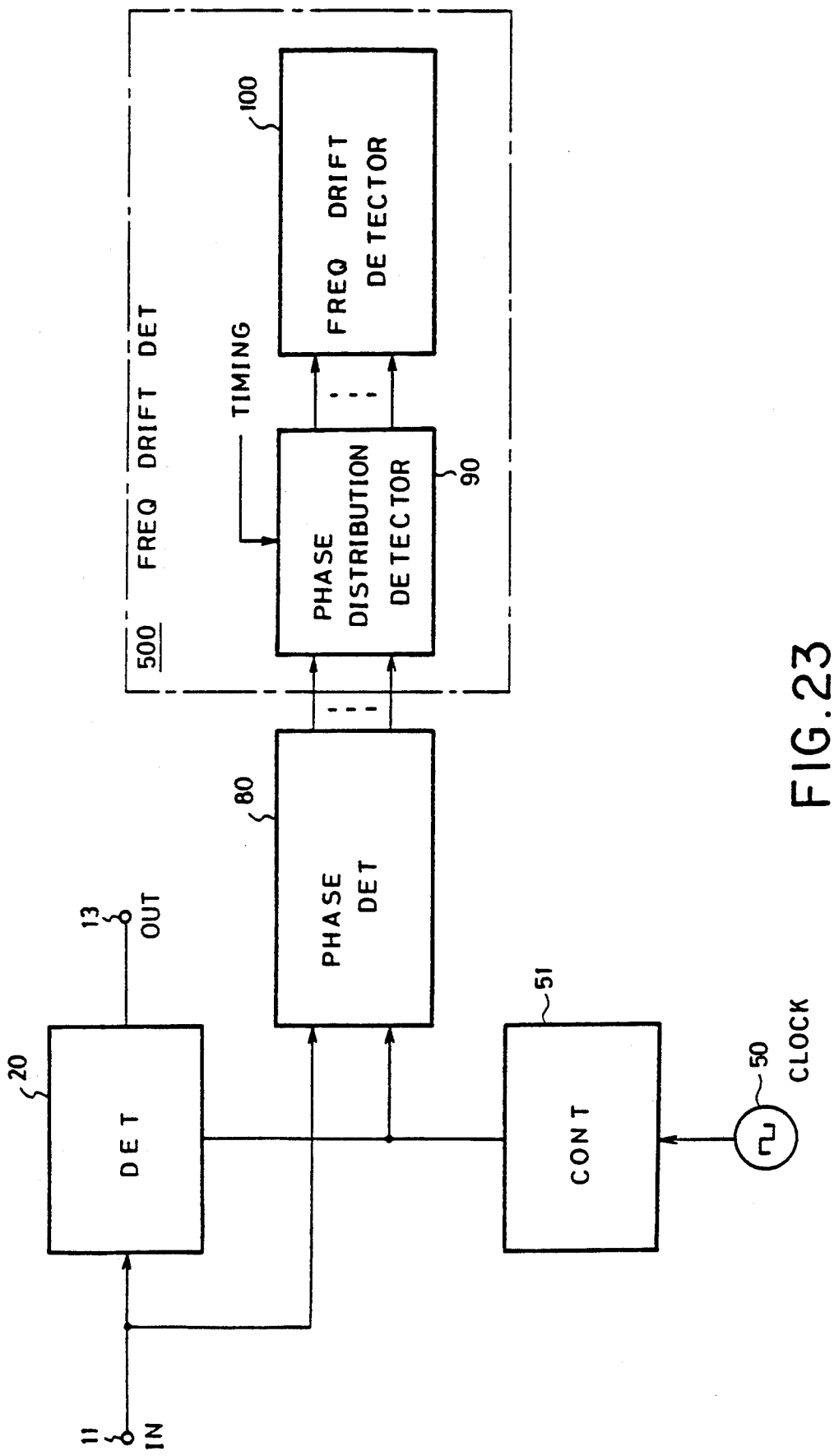
FIG. 23 is a block diagram to show the fifth embodiment of this invention digital demodulator.
Figure 24:
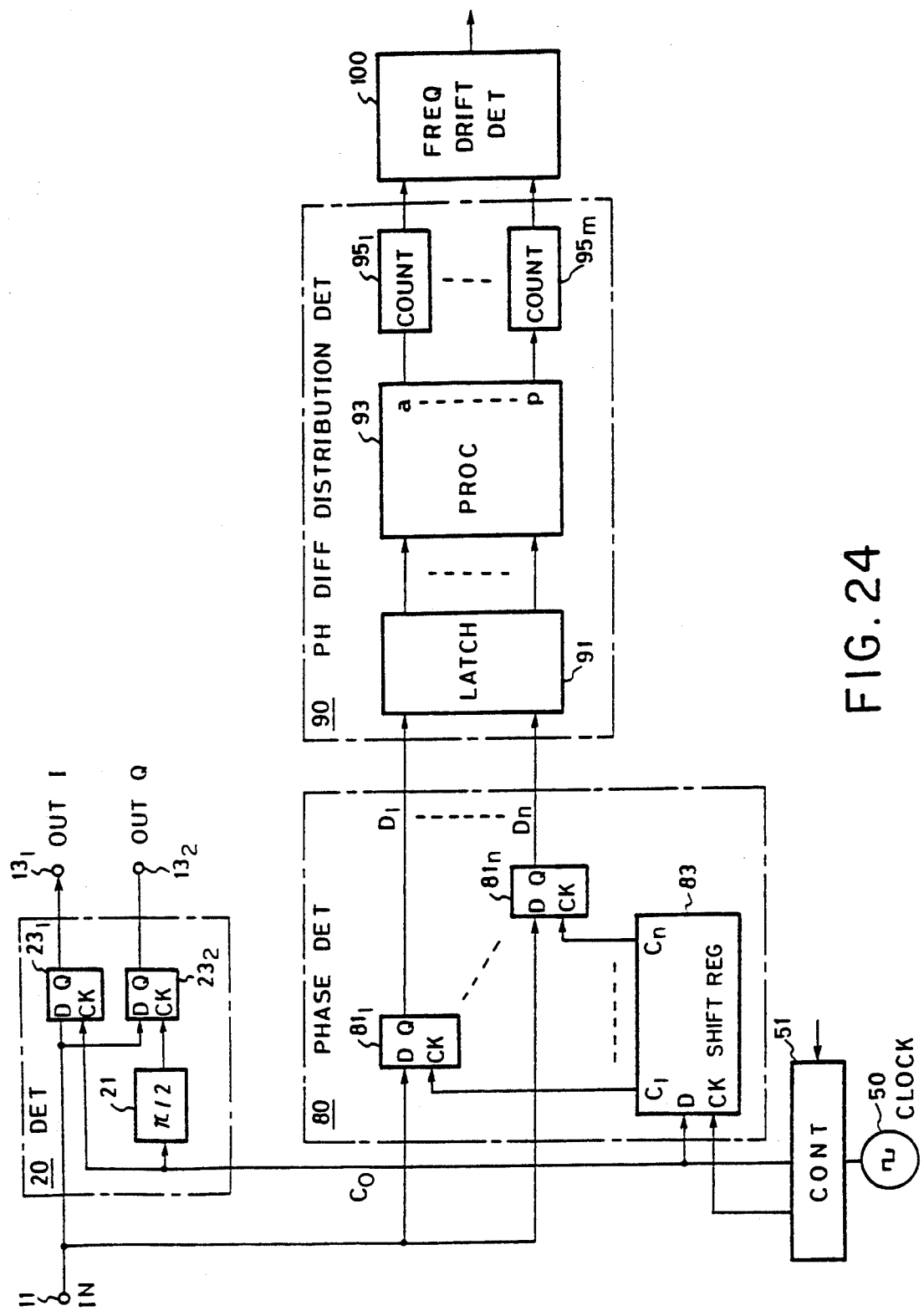
FIG. 24 is a block diagram to show the fifth embodiment of this invention digital demodulator in more detail.

FIG. 23 shows the fifth embodiment of the digital demodulator of this invention in a block diagram. FIG. 24 shows the fifth embodiment in more detail in block diagram.

In the fifth embodiment similarly as in the first embodiment in FIG. 3, the phase modulated signals inputted at the input 11 are those which have already been removed of amplitude deviations by a limitter and the like, and converted into digital signals of binary quantized (of which the duty ratio is 50%). Therefore, signals which have been modulated only in phase are inputted at the input 11.

In FIG. 24, a phase modulated signal inputted at the input 11 is detected by the detector 20 based on the reference signal of which the phase has been adjusted and on the signal obtained by shifting the above reference signal by $\pi/2$ phase, and outputted to the outputs $13_1$ and $13_2$ as detection signals I and Q. The reference numeral 21 denotes a $\pi/2$ shift circuit which shifts the reference signal by $\pi/2$ phase. The two reference signals act as the detection axes intersecting each other vertically likewise the recovered carrier in the case of coherent detection. Flip-flops $23_1$ and $23_2$ operate as phase comparators in this embodiment.

The phase modulated signal inputted at the input 11 is branched out and inputted at flip-flops $81_l$ through $81_n$ of a phase difference detection means 80. The reference signal of which the phase is to be adjusted is inputted at a shift register 83 of the means 80, and the output phase signals $C_l$ through $C_n$ are supplied as clocks for the flip-flops $81_l$ through $81_n$. The input phase modulated signal is latched corresponding to the phase signals $C_l$ through $C_n$ outputted from the shift register 83. The phase difference data $D_l$ through $D_n$ between the phase modulated signals outputted from the flip-flops $81_l$ through $81_n$ and the phase signals respectively are transmitted to a phase difference distribution detection means 90.

In the detection means 90, the input phase difference data $D_l$ through $D_n$ are latched by a latch circuit 91 at decision timings, and the latch output therefrom is transmitted to a phase difference processing circuit 93. The output from the processing circuit 93 is transmitted to corresponding counters $95_l$ through $95_m$ for counting. The outputs from the counters $95_l$ through $95_m$ are sent to a frequency drift detection means 100.

The operations of respective means will now be described.

Figure 25:
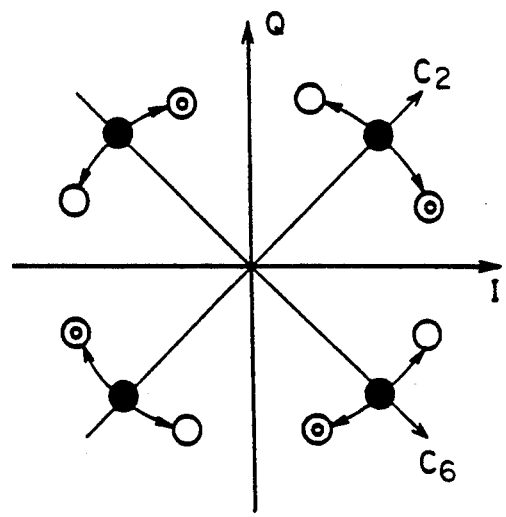
FIG. 25 is a view to explain frequency drift.
Figure 26:
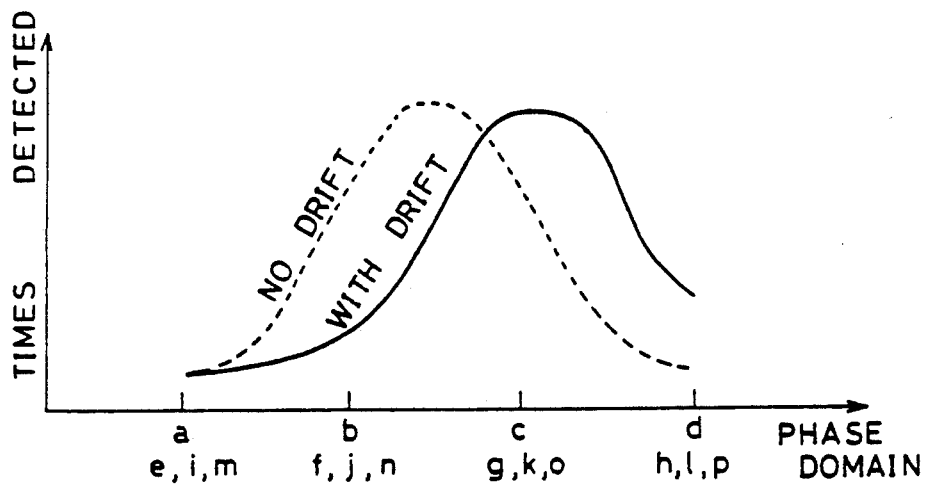
FIG. 26 is a graph to show an example of outputs (phase difference distribution) of the phase difference distribution detection means where a negative frequency drift exists.
Figure 27:
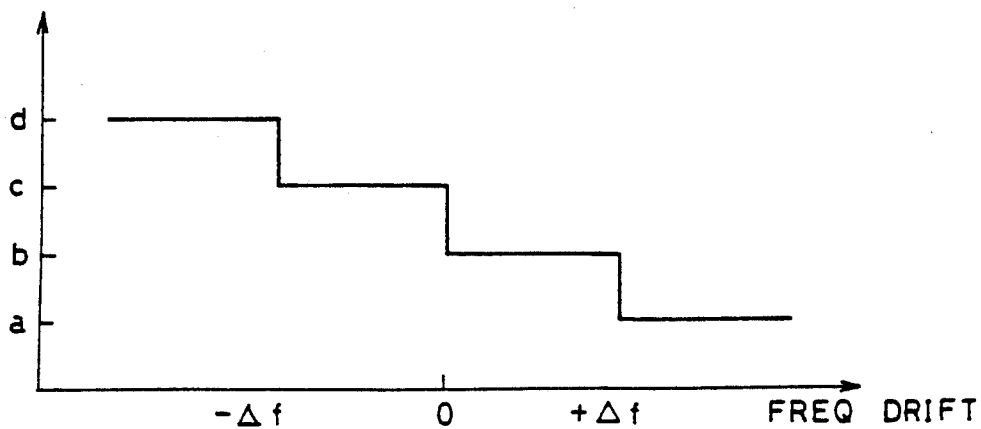
FIG. 27 is a graph to show a phase region where the number of detecting phase modulated signals is the maximum in relation to frequency drift.
Figure 28:
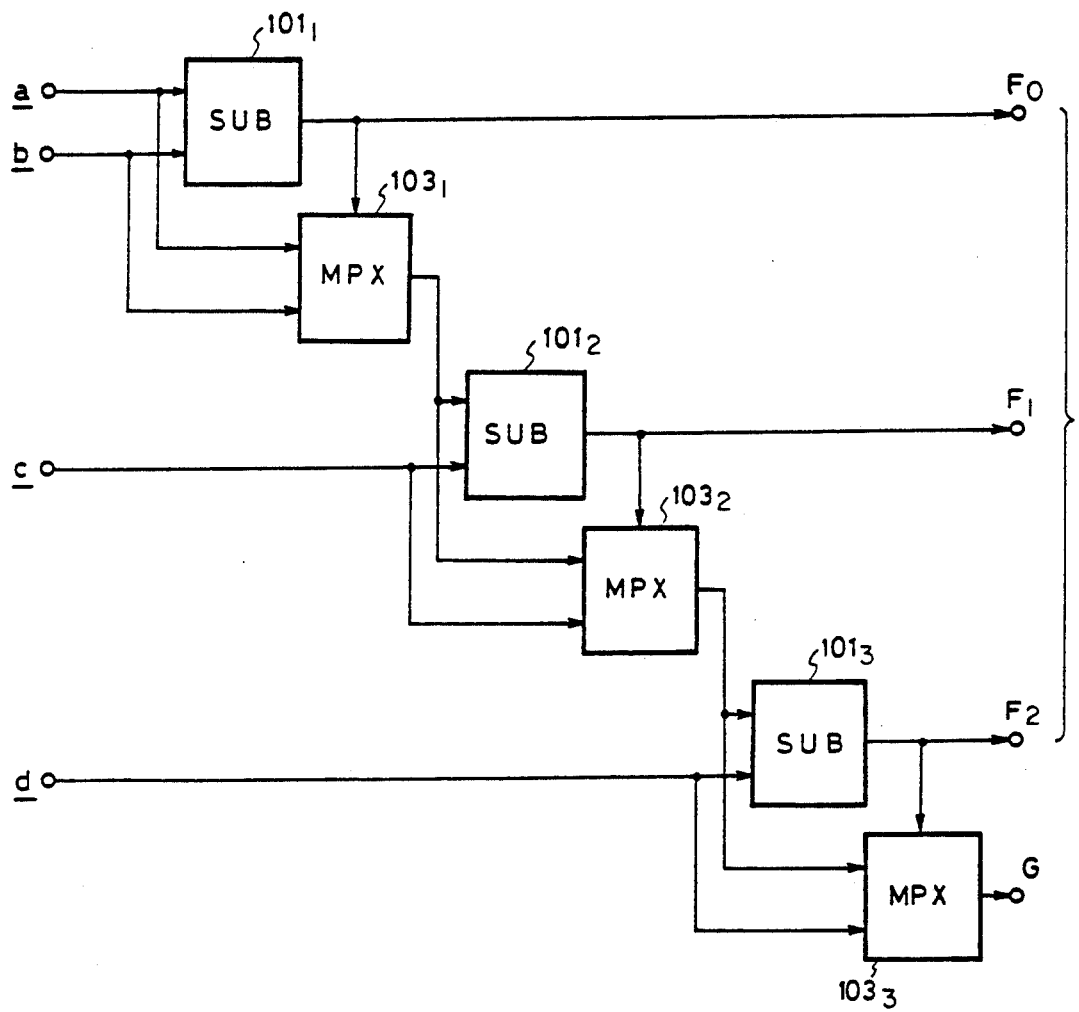
FIG. 28 is a block diagram to show a detection circuit which detects the phase region where the number of detecting phase modulated signals is the maximum.
Figure 29:
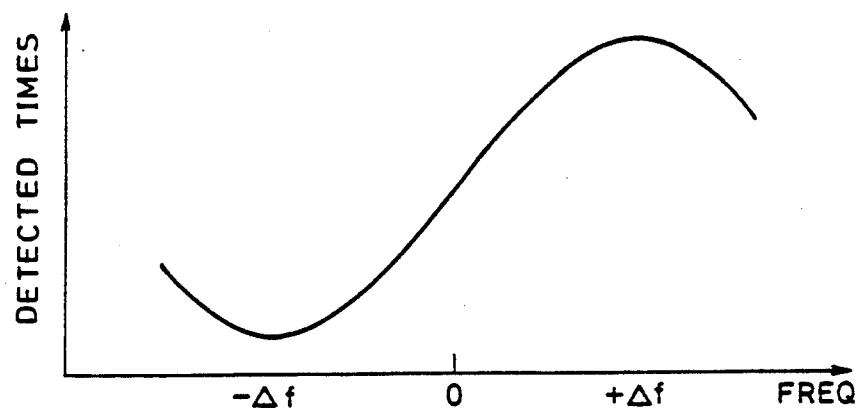
FIG. 29 is a graph to show the number of detection of the phase modulated signals in the designated phase region in relation to frequency drift.
Figure 30:
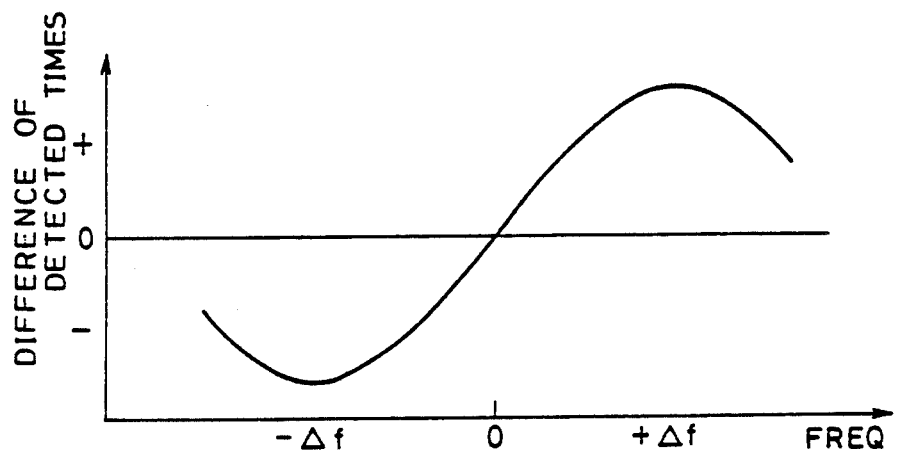
FIG. 30 is a graph to show the difference in the number of detection of phase modulated signals between two designated phase regions in relation to frequency drift.

FIG. 25 explains frequency drifts. FIG. 26 shows an example of outputs from the phase difference distribution detection means where negative drift exists (state of distribution of phase difference). FIG. 27 is a graph to show a phase region where the number of time when phase modulated signals are detected becomes maximum as against the drift frequency. FIG. 28 is a block diagram to show a circuit which detects such phase region where the number of detection time of the phase modulated signals becomes maximum. FIG. 29 is a graph to show the number of detection of the phase modulated signals at a designated phase region as against drift frequency. FIG. 30 is a graph to show the difference in detection number of phase modulated signals between two designated regions as against drift frequency.

In the shift register 83, the phase of an input reference signal is given as $C_0$ and a half cycle thereof is divided by n, and phase shift signals $C_l$ through $C_n$ are produced. When n is set at 8, and an 8-stage shift register 83 is used, eight phase shift signals $C_1$ through $C_8$ which are obtained by shifting the half cycle of a reference signal by 22.5 (or 360/16) degrees will be obtained. One cycle of a reference signal is divided by these phase shift signals $C_1$ through $C_8$ into 16 phase regions a through p as shown in FIG. 4.

For the phase shift signals $C_1$ through $C_8$ of eight phases, the phase difference detector means 80 latches phase modulated signals inputted at eight flip-flops $81_1$ through $81_8$.

If the modulated phase of the received signal is situated between the phase shift signals $C_3$ and $C_4$ as relative to the reference $C_0$ as shown in FIG. 4, and the rising edge thereof is situated between the rising edges of the phase shift signals $C_3$ and $C_4$, the phase difference data $[D_1 D_2 \ldots D_8]$ outputted from the flip-flops $81_1$ through $81_8$ becomes [00011111]. As the phase difference data differs depending on the phase of a phase modulated signal, the phase difference between a phase modulated signal and the reference signal can be obtained from the phase data.

The phase difference distribution detection means 90 latches the phase difference data outputted from the phase difference detection means 80 by a latch circuit 91 for each decision timing. Based on the latch output, the phase difference processing circuit 93 detects at which one of the phase regions of a through p the phase modulated signal is situated. Pulses are generated at a terminal representing the phase region d where the phase of the phase modulated signal exists. The phase difference processing circuit 93 may be easily structured with a simple sequential circuit. Counters $95_l$ through $95_m$ (m=16) corresponding to respective phase regions count pulses outputted from the phase difference processing circuit 93 at a predetermined cycle. By structuring the means in the above manner, it becomes possible to observe the distribution of the detected phases of the modulated signals at the phase regions a through p.

When the phase modulated signal is, for example, a QPSK signal, the four phases shown in FIG. 25 by (●) may be detected at decision timing. But if drift occurs in the carrier of the phase modulated signal, the detection phase thereof drifts in either the negative or positive direction. For instance, if a positive drift occurs, the detection phase (○) will deviate in the positive direction while if a negative drift occurs, the detection phase (◎) moves toward the negative direction.

FIG. 26 shows an example of outputs from the phase difference distribution detection means 90 where a negative frequency drift exists. In the graph, phase regions are plotted on the horizontal axis while the number of detection of the phase modulated signals counted by the counters $95_l$ through $95_m$ is plotted on the vertical axis. However, it should be noted that in case of QPSK signals, the number of detection of the phase modulated signals at the regions a, e, i and m, for instance, is added in order to degenerate the four modulated phases. In FIG. 26, the broken line denotes distribution without frequency drift, and its peak lies in the phase regions b(f,j,n) and c(g,k,o) as the modulated phase is $C_2$ and $C_6$ as against the one half cycle of the carrier. The solid line denotes the distribution with negative frequency drift, where the region in which the phase of a modulated signal is detected is shifted from the center toward the right side. In the case of positive drift, the region will be shifted toward the left.

Description will now be given to an estimation method by which a frequency drift detection means 100 estimates frequency drift of carrier based on the output from the phase difference distribution detection means 90.

Three methods will be explained.

Method 1

FIG. 27 is a graph to show phase regions (plotted on the vertical axis) where the number of detection of phase modulated signals becomes maximum as against drift frequency (plotted on the horizontal axis). However, the phase regions are degenerated into four, or a, b, c and d. Therefore, the phase region a includes regions of e, i and m. The same can be applied to other regions.

As shown in FIG. 27, the magnitude of frequency drift (±f) may be estimated by detecting a phase region of maximum detection out of the outputs from the detection means 90 (outputs from the counter $95_l$ through $95_m$). It should be noted, however, that the estimation error decreases proportionally to the size of the divided phase regions.

FIG. 28 shows an example of a circuit structure for detecting a phase region where the number of detection of phase modulated signals is maximum (or the outputs from the phase difference distribution detection means 90).

In FIG. 28, a subtractor $101_1$ calculates the difference between the detection number a of the first phase region a and the detection number b of the second phase region b, and a multiplexer $103_1$ selects whichever the larger of the two data (a or b) based on the coded data $F_0$. A subtractor 622 calculates the difference between the output from the multiplexer $103_1$ and the detection number c of the third phase region c, and a multiplexer $103_2$ selects whichever the larger of said output (a or b) or c based on the coded data F1. A substractor 1013 calculates the difference between the output from the multiplexer $103_2$ and the detection number d of the fourth phase region d, and a multiplexer $103_3$ selects whichever the larger of the data based on the coded data $F_2$, to eventually output the number of detection G in the region where the number of detection is the highest.

If the circuit is structured as above, based on the coded data [$F_0$, $F_1$, $F_2$] from the subtractors $101_1$ through $101_3$, it becomes possible to detect in which phase region the number of detection becomes maximum. In the structure shown in FIG. 28, if the input at an upper stage of the two inputs of the subtractors $101_1$ through $101_3$ is larger than the input at the lower stage, the relation holds as $F_i=0$, and if the input at the lower stage is larger, the relation holds as Fi=1. If [$F_0$, $F_1$, $F_2$]=[110], a<b, b<c and c<d, and the detection number becomes maximum in the region c.

If the circuit is structured in a manner that a reference signal is supplied from outside and phase modulated signals are detected with the reference signal, frequency drift of the carrier may be compensated by directly controlling the frequency of the reference signal.

In the structure where a delay circuit is used as a detector, the phase difference as against frequency drift may be learned by calculation in advance using the delay time of a delay circuit, and data corresponding to frequency drift may be prepared based on the data on the phase regions where the detection number (counted values) becomes maximum.

The obtained data may be used to compensate frequency drift of the carrier, for example, by using the data for controlling the delay of the delay circuit in the detector.

Method 2

FIG. 29 is a graph to show drift frequency (plotted on the horizontal axis) as against the detection number of the phase modulated signal in a designated phase region (vertical axis).

Frequency drift may be estimated conversely from the data which are measured in advance by measuring the detection number of the phase modulated signals in a designated phase region. The conversion circuit for converting the detection number into frequency drift is simply realized by means of a memory which stores measured data.

Method 3

FIG. 30 is a graph to show drift frequency (plotted on the horizontal axis) as against the difference in detection number between two designated phase regions (plotted on the vertical axis). Two regions are taken from both sides of a modulated phase (for instance the phase regions b and c).

As shown in FIG. 30, the direction of frequency drift may be detected by observing the positive or negative code in the detection number difference.

Although this method does not directly estimate the frequency drift, so far as the reference signal is supplied from outside, and phase modulated signal is detected with the reference signal, the method can control the frequency of the reference signal to be moved gradually in the direction of the drift compensation. If the delay of a delay circuit within a detector circuit is gradually varied based on the data in the direction of the drift compensation, then the delay can be converged into a certain value where the frequency drift is compensated. The compensation errors at this point depend on the width of the delay which is to be varied.

Figure 32:
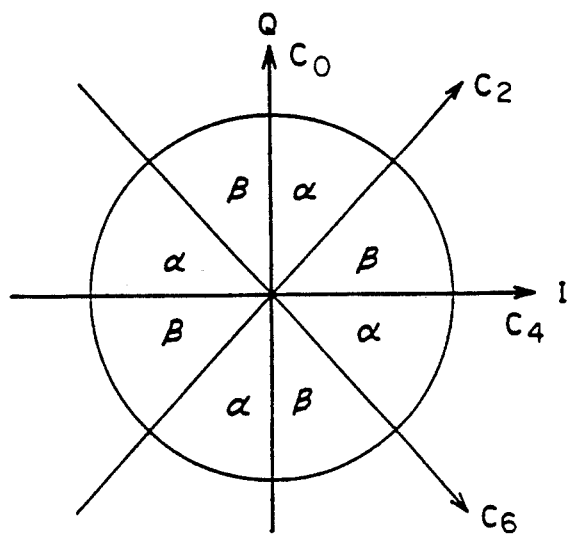
FIG. 32 is a chart to explain the operation of the phase difference processing circuit of the sixth emboidment of this invention digital demodulator.
Figure 31:
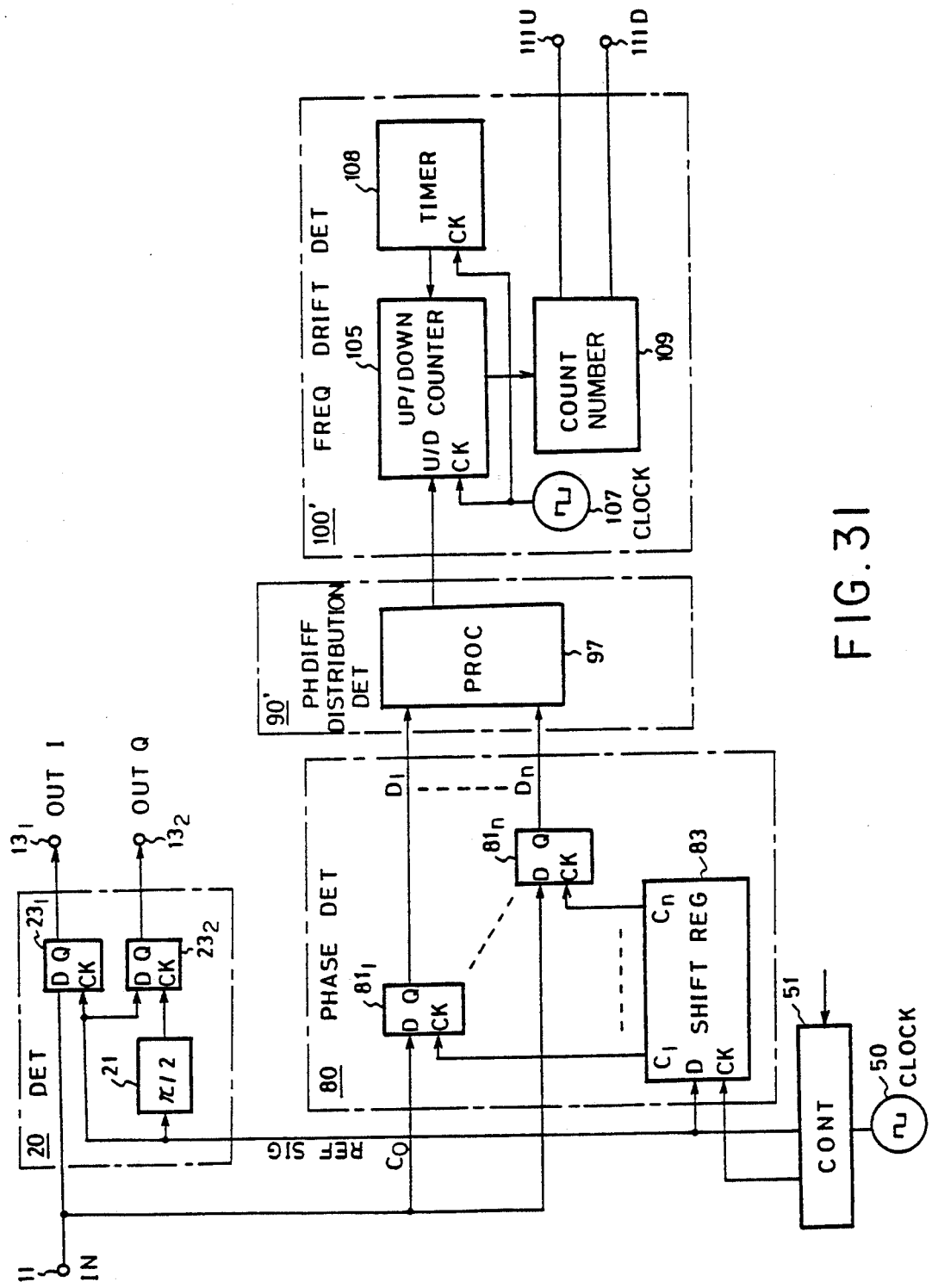
FIG. 31 is a detailed block diagram to show the sixth embodiment of this invention digital demodulator.

FIG. 31 is a block diagram to show the sixth embodiment of this invention digital demodulator, and FIG. 32 an explanatory view of the operation of a phase difference decision circuit of the sixth embodiment.

Since the sixth embodiment has the same structure in relation to the detector 20 and the phase difference detector means 80 as the fifth embodiment in FIG. 24, description therefor is omitted.

FIG. 31 shows a phase difference processing circuit 97 in the phase difference distribution detection means 90' which judges whether the rising edge of the phase modulated signal lies in the phase region α or phase regions β of FIG. 32 based on the data on the phase difference between the phase modulated signal and the reference signal outputted from the means 80 (provided the phase modulated signal is a QPSK signal). The decision circuit 97 may be structured with simple sequential circuits like the circuit 93.

The direction of the frequency drift (positive or negative) may be judged by comparing the time when the phase of the modulated signal stays in the region α with the time when it stays in the region β because the two time periods between substantially the same if there is no frequency drift.

The frequency drift detection means 100' comprises an up-down counter 105, a clock generator 107 which supplies clocks for the up-down counter 105, a timer 108 and a counted number detection circuit 109 which detects the counts by the up-down counter 105.

The up-down counter 109 counts upward clocks outputted from the clock generator 107 while the phase of the signal stays in the region α and counts downward clocks while the phase of the signal stays in the region β depending on the output from the phase difference processing circuit 97. The count detection circuit 109 monitors the number of the counts by the up-down counter 105 and when the number of counts exceeds a predetermined level in either direction, transmits detection pulses to corresponding outputs $111_u$ and $111_d$. The direction (either negative or positive) of the frequency drift may be judged from such detection pulses.

When the up-down counter 105 counts the output clocks from the clock generator 107, the timer 108 simultaneously starts counting the clocks. If the counts by the timer 108 reaches the preset value before the counts by the up-down counter 105 exceed a predetermined value set at the detection circuit 109, the timer resets the up-down counter 105 to resume counting. In this case, detection pulses are not transmitted to the outputs $111_U$ and $111_D$. By inserting the timer 108 in the circuit, it becomes possible to tolerate errors within a certain range to thereby stably control drift compensation.

So far as a reference signal is supplied from outside and the phase modulated signals are detected by the reference signal, the frequency of the reference signal can be directly varied gradually in the direction of the frequency drift compensation of the carrier.

When a differential detector is used as the detector, the delay of the delay circuit in the detector is varied gradually based on the data in the direction of compensation, so that the delay can be substantially converged to a certain value where the frequency drift is compensated. The compensation errors at this point depend on the width of the delay to be varied.

The phase difference detection means 80, the phase difference distribution detection means 90, 90' and the frequency drift detection means 100, 100' can be structured as digital circuits and can obtain the frequency drift information by digital signal processing.

Although the fifth and sixth embodiments are described in relation to detectors of the phase modulated signals of which the performance is affected by the frequency drift in the carrier, the frequency drift detection means in the fifth and sixth embodiments are not dependent on the modulation method.

As described in the foregoing, the frequency drift detection means in the fifth and sixth embodiments detect the phase difference between the modulated signal and the reference signal by digital processing, and obtain the data which are proportionate to the frequency drift based on the phase difference distribution, and the structure can be realized with digital circuits. More specifically, they need no analog parts, can be realized as a completely integrated one chip digital IC if only a frequency drift detection means and a single frequency oscillator are attached from outside as the clock for the phase shift means. Therefore, the structure requires no adjustment, can reduce power consumption and can be made less expensive.

If the data obtained by the frequency drift detection means in the fifth and sixth embodiments are fed back to a circuit which can vary the frequency of the reference signal of the detector, the frequency drift of the carrier may be compensated to achieve stable detection operation. Moreover, if a feed back loop is added to connect the data to a circuit which can vary the frequency of the reference signal, compensation is constantly made even if the frequency drift of the carrier changes chronologically.

Figure 33:
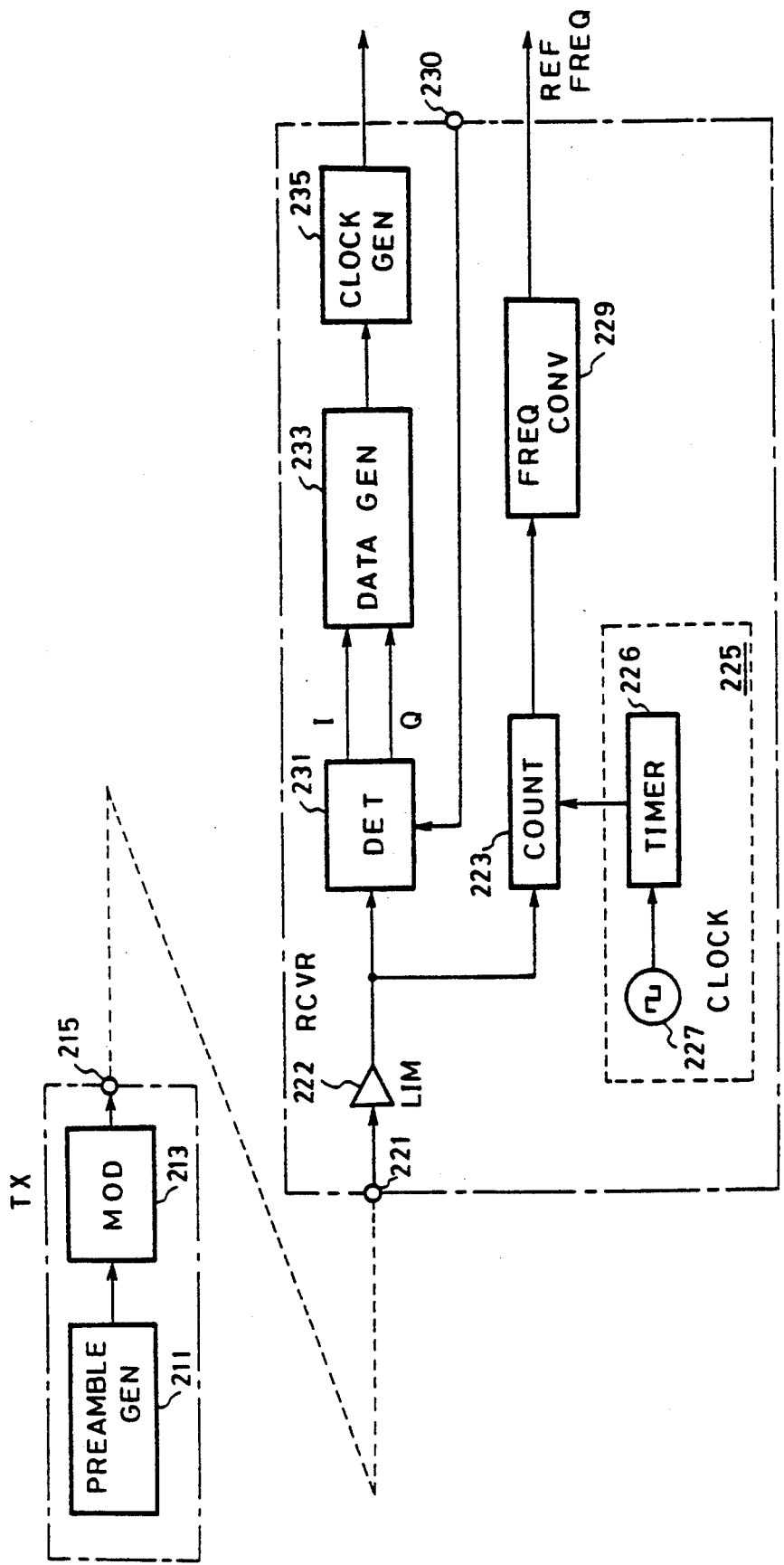
FIG. 33 is a block diagram to show the seventh embodiment of this invention digital demodulator.

FIG. 33 is a block diagram to show the seventh embodiment of the digital demodulator of this invention.

In FIG. 33, a preamble generation circuit 211 on the transmission side generates preamble signals suitable to recover clocks on the reception side. More particularly, it generates preamble signals including a clock frequency component which does not make the amplitude of the modulated signal zero and of which signals after detection repeat "0" and "1". In actual transmission, the preamble signals are added before transmission data, modulate the carrier at a modulator 213 and are outputted from an output 215.

The modulated signals are inputted from an input 221 at a counter 223 via a limiter amplifier 222 on the side of receiver to measure the frequency thereof. The counter 223 is structured to count the edges of the modulated signals in either rising or trailing direction only for the gate time corresponding to the gate signals outputted from a gate signal generator 225. The gate signal generator 225 comprises a timer 226 and a clock 227 for the timer and generates signals equivalent to the time which is an integral multiple of the frequency of the modulated signal in one symbol.

The reference signal frequency converter 229 converts the frequency of the modulated signal measured by the counter 223 into the frequency of the reference signal for detection (intermediate frequency). The reference signal frequency which has been processed for compensation for drift and the like is inputted at an input 230, and the reference signal is used at a detector 231 for detection of modulated signal which is inputted via a limitter 222.

The detector 231 detects the phase of the modulated signal with the in-phase component and the quadrature component of the reference signal, and outputs I and Q signals respectively. These outputs from the detector are inputted at a clock recovery circuit 235 via a data generation circuit 233 for clock recovery.

The operations of circuits will now be described exemplifying the $\pi/4$ shift QPSK modulation method.

FIG. 34 is a view to explain the principle of the $\pi/4$ shift QPSK modulation method. FIG. 35 is an explanatory view of the preamble generation by the $\pi/4$ shift QPSK modulation method, and FIG. 36 is a view to show the changes in frequency of the modulated signals in a short period of time when preamble signals are transmitted.

Figure 34A:
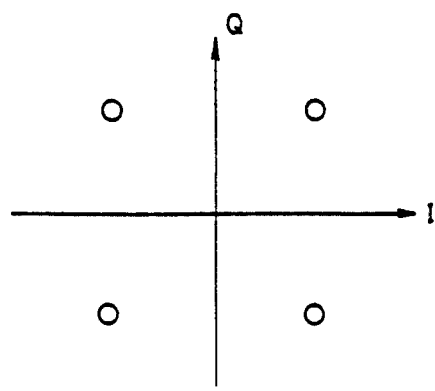
FIG. 34 are graphs to explain the modulation principle in $\pi/4$ shifted QPSK modulation method.
Figure 34B:
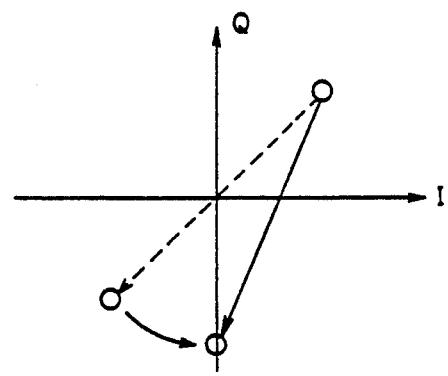

FIG. 34(a) shows modulation phases in a signal space of the QPSK signals, and FIG. 34(b) shows a modulation method which rotates a QPSK signal by $\pi/4$ for the timing of one symbol in a predetermined direction.

As the phase is shifted by $\pi/4$ for each symbol timing in this method, if the axis which is the reference for detection is shifted by $\pi/4$, the movement of the signal becomes quite similar to that of QPSK with respect to the detection. Therefore, when a $\pi/4$ shift QPSK signals is to be detected, the phase of the reference signal should be shifted from the carrier by $\pi/4$ for each discrimination timing.

Figure 35A:
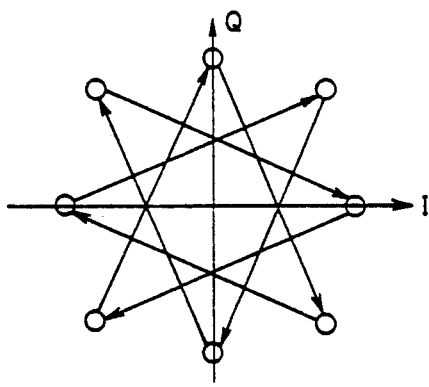
FIG. 35 are graphs to explain the operation of preamble generation by the $\pi/4$ shifted QPSK modulation method.
Figure 36:
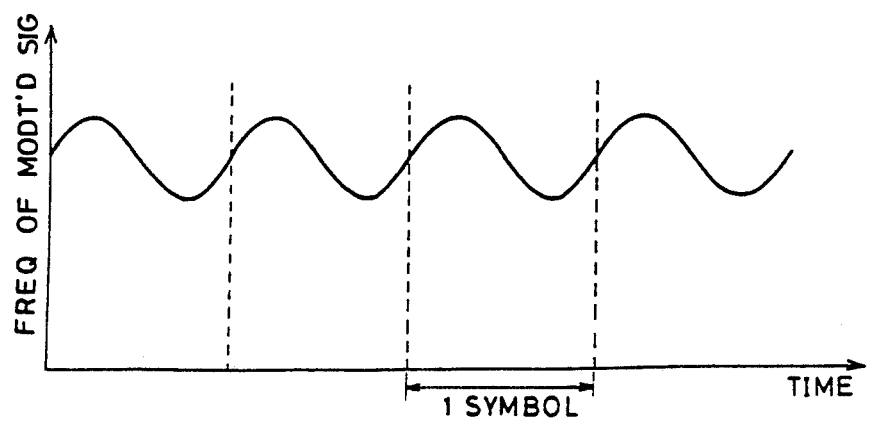
FIG. 36 is a graph to show the changes in instantaneous frequency of the modulated signal at the time of preamble signal transmission.

The preamble generation circuit 211 generates the pattern of preamble signals in a manner that when the signal is modulated in $\pi/4$ shift QPSK by the modulator 213, the modulated phase follows the track shown in FIG. 35(a). A number of preamble signal types are possible depending on the method of mapping which determines at which phase of the carrier an input signal is to be allocated, but when the $\pi/4$ shift QPSK method is used, it is most preferable to use a signal which makes the phase of the modulated signal to follow the track as shown in FIG. 35(a).

Figure 35B:
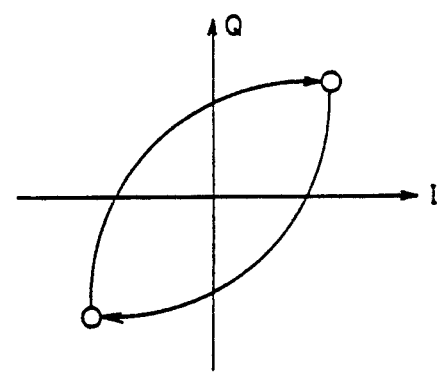

The modulation signals which have been modulated with the preamble signals are equivalent to modulated signals which alternately change between two diagonal phases shown in FIG. 35(b) if they are detected by the reference signal which is shifted by $\pi/4$ for each timing, and if the phase of the reference signal is assumed to be fixed. Then, both of the I and Q signals outputted from the detector 231 become the signals which change in state for each symbol (signal repeating "1" and "0") and if either one of these two signals is inputted at the clock recovery circuit 235 via the clock recovery data generation circuit 233, clocks will be recovered.

The counter 223 measures the frequency of the modulated signals which have been modulated with such preamble signals. The instantaneous frequency of the signals which are modulated with preamble signals changes periodically for each symbol as one period as shown in FIG. 36 because of modulation with preamble for clock recovery. Therefore, if the frequency is measured by setting the gate time as an integral multiple of the period, the average frequency of the modulated signals can be obtained without fluctuation.

For measuring the frequency of the modulated signals, gate signals which correspond to the time which is an integral multiple of the period of a symbol are generated by the timer 226 and the clock 227 for the timer in the gate signal generator 225, and the edges of the modulated signals are counted by the counter 223 for the gate time indicated by the gate signals. The measurement precision is determined by the measurement time. For instance, if the precision of 1 Hz is required, the time of 1 sec. is needed for measurement.

As described in the foregoing, since the frequency of the modulated signals may be measured and converted to the frequency of the reference signal even while the preamble signals for clock recovery of the seventh embodiment are being transmitted, setting of preamble signals otherwise required for the measurement of the frequency of the reference signal is no longer necessary, and transmission efficiency is enhanced.

As the measurement of the modulated signal frequency can be realized by a simple digital circuit with counters and the like, this invention demodulator can be operated faster, needs no adjustment, consumes less power, and is made at lower cost by integrating the circuits.

The seventh embodiment of this invention is applicable to the detection of modulated signals at an optimal state by using the reference signal which has been compensated for drifts and the like based on the result of the frequency measurement in the mobile communication or satellite communication where signals are transmitted in burst.

Figure 37:
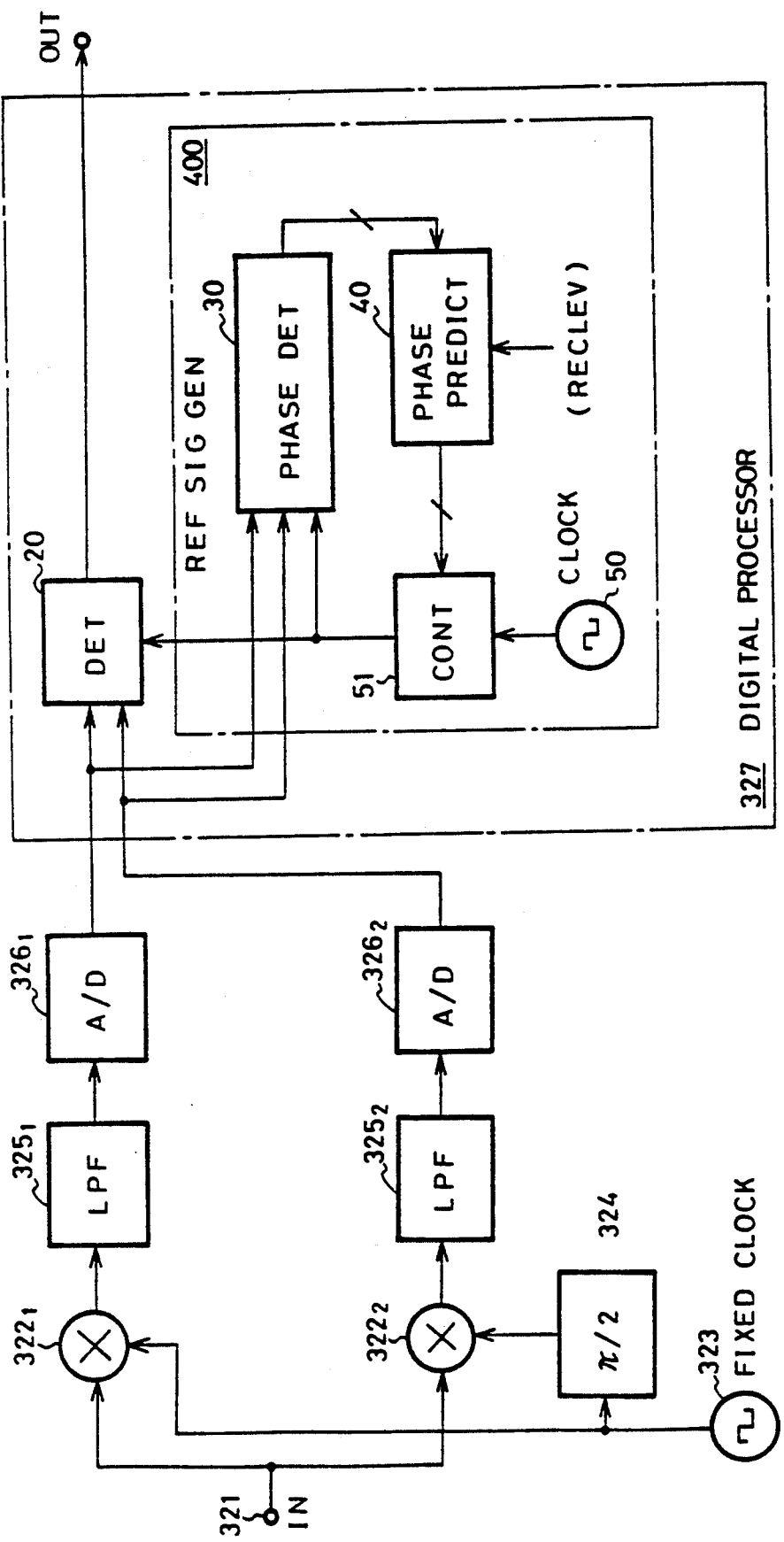
FIG. 37 is a block diagram to show the eighth embodiment of this invention digital demodulator.

FIG. 37 is a block diagram to show the eighth embodiment of the digital demodulator of this invention, which may be structured with digital circuits at intermediate frequency. Even after the signals are quasi-coherently detected and converted to the base band, still it can be structured with digital processors.

Figure 38:
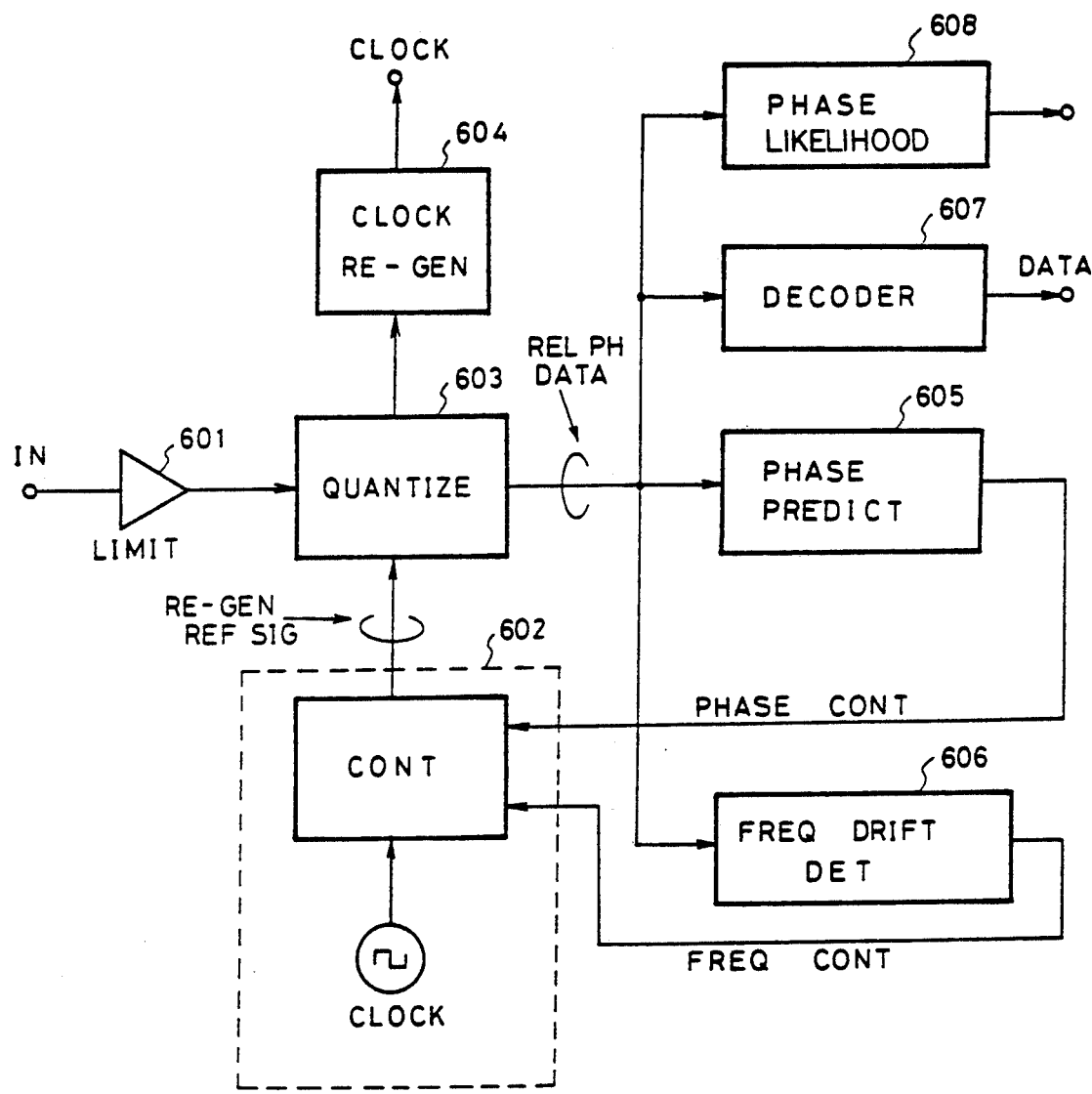
FIG. 38 is a block diagram to show the ninth embodiment of this invention digital demodulator.
Figure 39:
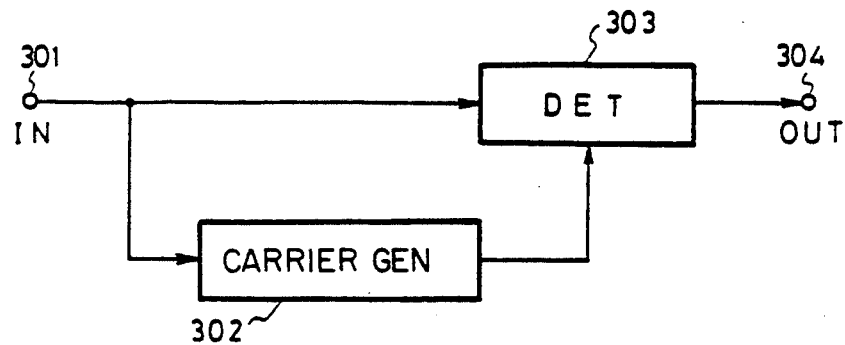
FIG. 39 is a block diagram to show the basics of a coherent detector.
Figure 40:
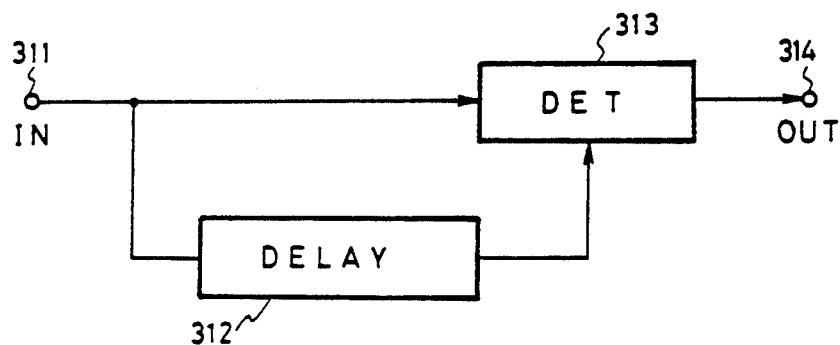
FIG. 40 is a block diagram to show the basics of a differential detector.
Figure 41:
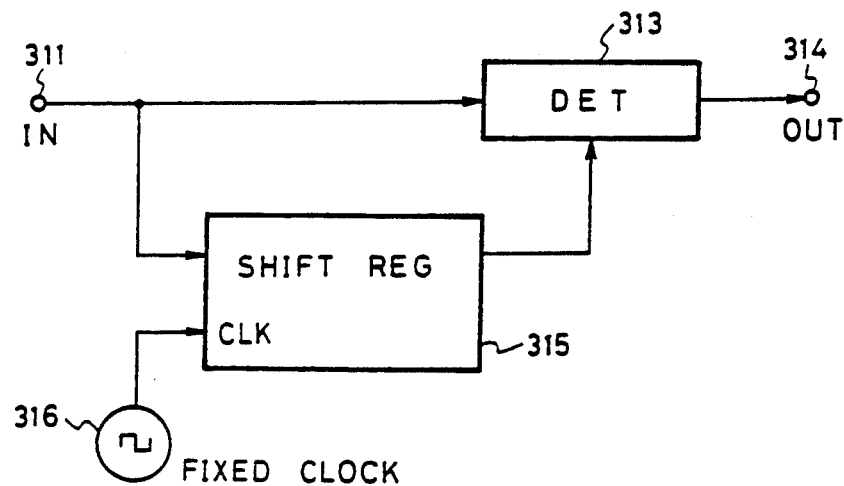
FIG. 41 is a block diagram to show the basics of a digital type differential detector.
Figure 42:
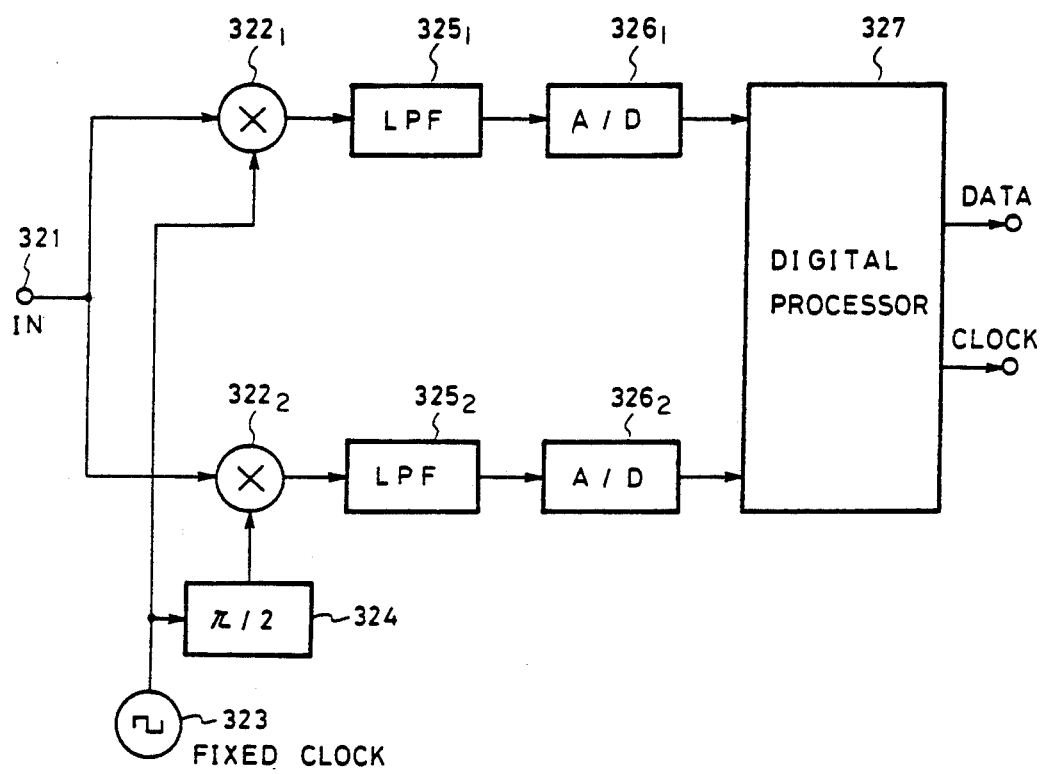
FIG. 42 is a block diagram to show a demodulator using a digital signal processing type detection circuit.

FIG. 38 is a block diagram to show the ninth embodiment of the digital demodulator of this invention wherein the digital demodulator comprises a direct phase quantization circuit 603 which detects modulated signals with recovered reference signals so as to detect the relative phase of the modulated signal in relation to the recovered reference signal in the form of digital data in bits, a reference signal phase prediction circuit 605 which predicts the phase of the reference signal suitable for detection at the following symbol based on thus detected relative phase data, a frequency drift detection circuit 606 which detects the frequency drift based on the relative phase data detected at plural past symbols and predicts frequency of the reference signal suitable for compensating the drift, a digital oscillator 602 which generates from a single frequency oscillator the reference signal of which phase is controlled particularly corresponding to the predicted phase and frequency, and a phase likelihood detection means 608 which outputs phase likelihood data which indicates the quality of composite data based on the detected relative phase data (Japanese Patent Application Hei-1-75918, PCTJP 90/00393, Diversity Receiver).

The ninth embodiment of this invention has an excellent bit error rate performance under thermal noises and fading, requires less power, and can be made compact, economical and needs no adjustment.

What we claim is:
1. A digital demodulator comprising:
   reference signal generation means for generating a predetermined reference signal responsive to a received phase modulated signal;
   detector means for detecting said phase modulated signal using the reference signal;
   reception level indicating means for providing a signal indicative of a reception level of said received phase modulated signal;

phase difference detection means in said reference signal generation means for detecting a phase difference between a phase of said reference signal and a phase of said phase modulated signal and for outputting said difference as phase difference data;

reference signal phase prediction means in said reference signal generation means for receiving said phase difference data, for predicting a phase which is to be newly set for said reference signal and for outputting reference signal phase prediction data corresponding to said predicted phase and determined responsive to said reception level signal;

reference signal control means in said reference signal generation means for generating said reference signal based on said reference signal phase prediction data; and input clock means for providing a clock signal to said reference signal control means, said reference signal having a phase designated by said input clock means.

2. The digital demodulator as claimed in claim 1 wherein said reference signal generation means comprises:

frequency drift detection means for receiving said phase difference data, for detecting a frequency drift between a carrier of said phase modulated signal and said reference signal and for outputting said frequency drift as frequency drift data;

frequency drift compensation data generation means for receiving said frequency drift data and for outputting frequency drift compensation data for controlling the phase of said reference signal responsive to said frequency drift data; and adder means for adding said reference signal phase prediction data and said frequency drift compensation data to obtain said control signal and for transmitting said control signal to said reference signal control means.

3. The digital demodulator as claimed in claim 2 wherein said frequency drift compensation data generation means comprises:

means for controlling said frequency drift compensation data so that a value of the data does not exceed a predetermined value.

4. The digital demodulator as claimed in claim 1 further comprising:

decision timing means for providing decision timing signals indicative of decision timings;

phase difference distribution detection means for receiving said phase difference data, for latching said phase difference data responsive to said decision timing signals and for detecting a distribution of said phase difference data; and frequency drift detection means for calculating a frequency drift between a carrier of said phase modulated signal and said reference signal and for calculating a drift direction of said frequency drift based on the phase difference distribution data.

5. The digital demodulator as claimed in claim 4 wherein said frequency drift detection means comprises:

means for outputting a drift signal if the frequency drift exceeds a predetermined value and for recalculating said drift if the drift direction is not determined by measurements at a predetermined time interval.

6. The digital demodulator as claimed in either claim 1 or claim 5 further comprising:

means for measuring the frequency of said phase modulated signal, said measurement being conducted within a time period equivalent to a multiple of one symbol period by an integer when an amplitude of said phase modulated signal does not become zero and while the digital demodulator is receiving phase modulated signals obtained by modulating detected signals with preamble signals for clock recovery and for providing said measured frequency to said reference signal generation means, said predetermined reference signal being responsive to said measured frequency.

7. A digital demodulator comprising:

reference signal generation means for generating a predetermined reference signal responsive to a received phase modulated signal;

detector means for detecting said phase modulated signal with the reference signal;

phase difference detection means in said reference signal generation means for detecting a phase difference between said reference signal and said phase modulated signal and for outputting phase difference data;

phase deviation data conversion means for receiving said phase difference data, for detecting a deviation of a phase of said reference signal from a phase of said phase modulated signal, and for outputting an indication of said deviation as phase deviation data;

memory means for storing carrier phase deviation data and for outputting said carrier phase deviation data as reference signal phase prediction data responsive to a memory address;

decision timing means for providing decision timing signals indicative of decision timings;

reference signal phase prediction means for generating carrier phase deviation data corresponding to phase deviations in the carrier responsive to said phase deviation data and said memory output data, for storing said carrier phase deviation data in said memory means during a predetermined number of said decision timings, and for using said carrier phase deviation data as a memory address to said memory means, thereby causing said memory means to output reference signal phase prediction data which predicts a phase of the reference signal at a next decision timing;

reference signal control means for receiving said reference signal phase prediction data and for generating said reference signal; and input clock means for providing a clock signal to said reference signal control means, said reference signal having a phase designated by said input clock means.

8. The digital demodulator as claimed in claim 7 wherein said reference signal phase prediction means comprises:

averaging means for averaging said phase deviation data over a predetermined number of past decision timings corresponding to the reception levels of said phase modulated signals and for outputting said average as reference signal phase average data; and selection means for outputting one of said memory output data and said reference signal phase average data as said reference signal phase prediction data for a next decision timing, said outputting being responsive to said reception level.

9. The digital demodulator as claimed in claim 7 further comprising:

phase difference distribution detection means for receiving said phase difference data, for latching said phase difference data responsive to said decision timing signals and for detecting a distribution of said phase difference data; and frequency drift detection means for calculating a frequency drift between a carrier of said phase modulated signal and said reference signal and for calculating a drift direction of said frequency drift based on the phase difference distribution data.

10. The digital demodulator as claimed in claim 9 wherein said frequency drift detection means comprises:

means for outputting a drift signal if the frequency drift exceeds a predetermined value and for recalculating said drift if the drift direction is not determined by measurements at a predetermined time interval.

11. A digital demodulator comprising:

single frequency oscillator means for generating two signals at a substantially identical frequency as a carrier of a received phase modulated signal, one of said two signals being a first signal;

shifting means for shifting a phase of the other of said two signals by $\pi/2$ radians relative to the other of said two signals to produce a second signal;

quasi-coherent detector means for detecting in quasi-coherence said phase modulated signals with the first and second signals and for providing output signals indicative of said detection;

analog/digital converter means for digitizing the output signals from the quasi-coherent detector means;

reference signal generation means for generating a predetermined reference signal responsive to said phase modulated signal; and digital signal processing means for demodulating respective output signals from said analog/digital converter means responsive to said reference signal;

phase difference detection means in said reference signal generating means for detecting a phase difference between said reference signal and said phase modulated signal and for outputting the phase difference data;

reference signal phase prediction means in said reference signal generating means for receiving said phase difference data, for predicting a phase to be newly set for said reference signal, and for outputting the reference signal phase prediction data selected in accordance with the reception level of said phase modulated signal;

reference signal control means in said reference signal generating means for receiving said reference signal phase prediction data and for generating said reference signal; and input clock means for providing a clock signal to said reference signal control means, said reference signal having a phase designated by said input clock means.

* * * * *